United States Patent [19]
Campbell

[11] Patent Number: 5,626,353
[45] Date of Patent: May 6, 1997

[54] MOBILE CART INCLUDING BEVERAGE CHILLING AND DISPENSING APPARATUS

[76] Inventor: Craig Campbell, 90 Wilson Ave., Englishtown, N.J. 07726

[21] Appl. No.: 257,167

[22] Filed: Jun. 9, 1994

[51] Int. Cl.⁶ .................... B62B 3/02; B62B 3/10
[52] U.S. Cl. ............ 280/47.35; 280/79.2; 62/457.1; 297/22
[58] Field of Search ........... 280/47.34, 47.35, 280/79.11, 79.3, 79.2, 79.5, 47.18, 35, 30; 296/22; 62/337, 371, 386, 457.1, 457.7, 457.8

[56] References Cited

U.S. PATENT DOCUMENTS

| | | | |
|---|---|---|---|
| D. 132,749 | 6/1942 | Dinsmore | D34/20 |
| 184,292 | 11/1876 | Matthews | 296/22 |
| D. 228,063 | 8/1973 | Keesihn | D7/347 |
| D. 323,051 | 1/1992 | Baggott | D34/19 |
| 1,375,121 | 4/1921 | Swartzbaugh | 296/22 |
| 1,585,834 | 5/1926 | Drinkwater | 296/22 |
| 1,760,854 | 5/1930 | Wright | 296/22 |
| 1,979,549 | 11/1934 | Huckel | 296/22 |
| 2,361,970 | 11/1944 | Schmitt | 119/14.11 |
| 2,845,780 | 8/1958 | Conklin et al. | 296/22 |
| 3,735,898 | 5/1973 | Smith | 222/129.4 |
| 3,874,531 | 4/1975 | Mayo | 280/79.2 |
| 3,949,902 | 4/1976 | Thompson | 296/22 |
| 3,974,658 | 8/1976 | Starrett | 62/371 |
| 4,652,062 | 3/1987 | Greenwood | 280/47.35 |
| 4,724,681 | 2/1988 | Bartholomew et al. | 62/239 |
| 4,846,485 | 7/1989 | Payne | 280/47.18 |
| 4,886,286 | 12/1989 | Whorton, III | 280/47.35 |
| 4,989,291 | 2/1991 | Parent | 15/315 |
| 5,048,857 | 9/1991 | Stevens | 280/79.2 |
| 5,306,028 | 4/1994 | Pike et al. | 280/47.35 |

*Primary Examiner*—Anne Marie Boehler
*Attorney, Agent, or Firm*—Pollock, Vande Sande & Priddy

[57] ABSTRACT

A mobile cart, comprising a frame module including a plurality of frame members. The frame members include a perimeter frame member. At least one caster wheel supporting member, supporting at least one caster wheel, and at least one handle member are attached near a first end of the perimeter member. Right and left main supporting wheel members are mounted near the apex of the perimeter member. A floor member is supported by the frame module. A beverage component container retaining assembly is included in the floor member. A cooling and dispensing module includes a beverage chilling assembly and a dispensing unit including at least one dispensing valve; or a liquid receiving and dispensing module holds a liquid to be dispensed and maintains the liquid substantially at a desired temperature. A substantially vertical side member extends at least partially around the cart.

22 Claims, 25 Drawing Sheets

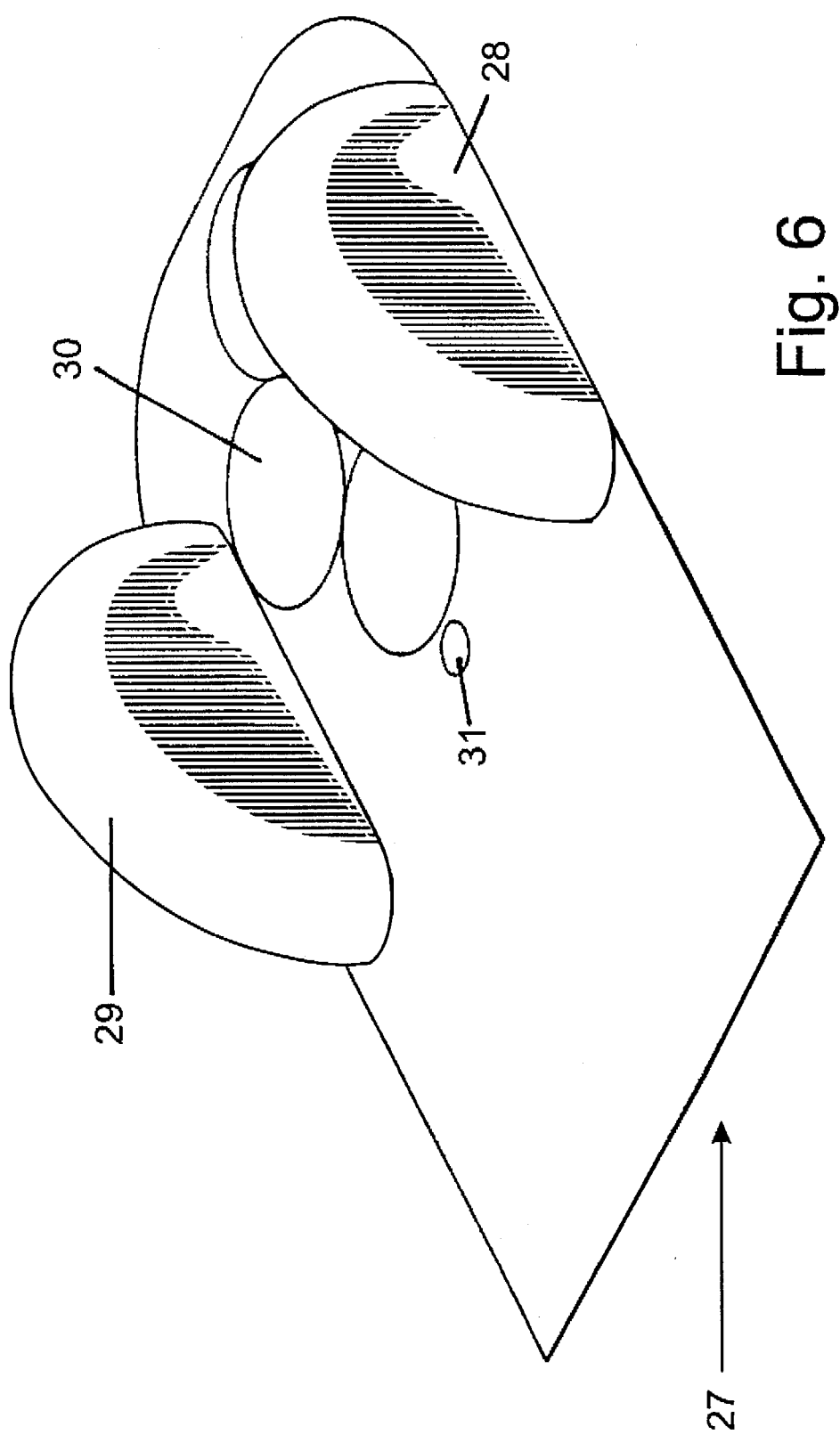

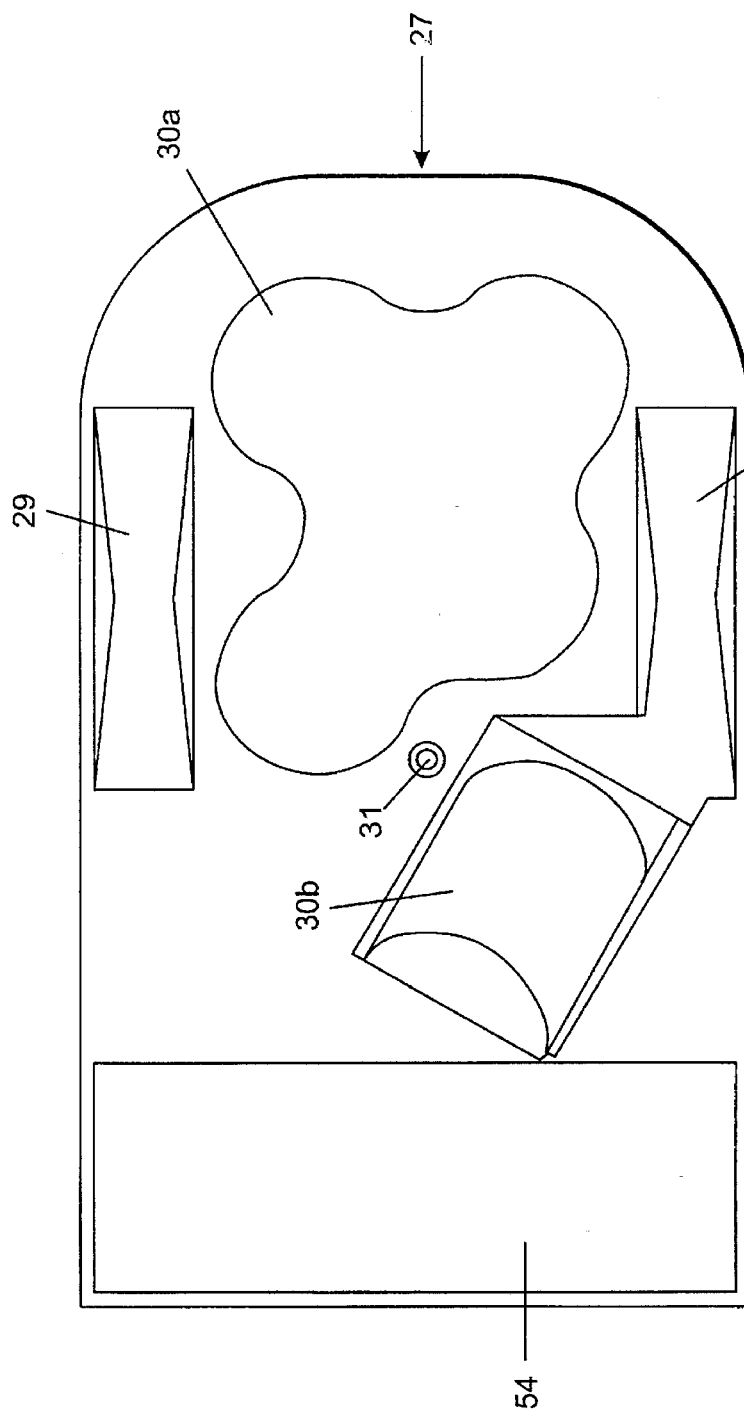
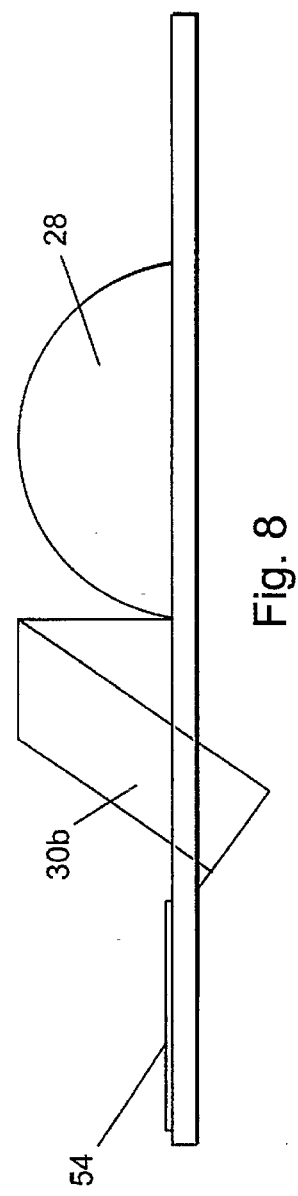

MOBILE CART INCLUDING BEVERAGE CHILLING AND DISPENSING APPARATUS

FIELD OF THE INVENTION

The present invention is directed toward a mobile cart including apparatus for dispensing chilled and/or heated beverages stored in tanks mounted on the cart.

BACKGROUND OF THE INVENTION

Carts are often used by vendors on city streets as a means of storing and transporting a variety of food and beverage items. Such carts are often used at garden parties and country clubs to provide food and drink to people at locations remote from buildings and/or sources of electricity where storage, refrigeration, and dispensing equipment are not readily available. Food and drink carts are also used at in variety of other locations.

Regardless of where they are used, carts usually include space to store food and beverages to be sold later. Often, carts for dispensing beverages will have an insulated container filled with ice in which cans or bottles of soda, juice, beer, wine, or other beverages which are to be served chilled are stored and maintained in a chilled condition. Carts are also employed to carry and dispense heated beverages or other liquids such as soup. Such carts usually include two or more wheels which allow them to be transported from place to place.

The food and beverage items sold on carts are usually of prepackaged into individual serving sizes, such as cans of soda. To provide a cart with the ability for premium quality beverage dispensing requires equipping the carts with electric power, water tanks, and/or post-mix beverage component tanks, among other equipment. Such equipment is expensive to purchase, install, and operate. Additionally, such equipment cannot be easily placed on a cart without making the cart too big to be easily transportable. Further, a source of electricity is not usually available for a transportable cart and connecting a cart to a source of electricity would reduce the transportability of the cart.

SUMMARY OF THE INVENTION

The invention solves many of the problems existing in the prior art by providing a lightweight, self-sufficient, flexible beverage push cart equipped with an efficient pre-mix dispensing system utilizing manual dispensing valves that offer fresh product, transportability, and more serving mobility.

According to preferred aspects, the present invention provides a mobile cart, comprising a frame module including a plurality of frame members. The frame members include a perimeter frame member having at least one segment. A caster wheel mounting and supporting assembly is attached in the vicinity of a first end of the perimeter frame member. At least one handle member is also connected in the vicinity of the first end of the perimeter frame member.

Right and left main supporting wheel members are supported by a main supporting wheel mounting assembly. The mounting assembly includes at least one main supporting wheel member; this member may be an axle. The main supporting wheel members are located near a second end of the perimeter frame member.

At least one caster wheel member is supported by the caster wheel supporting assembly. The caster wheel member supporting assembly includes an axle upon which the caster wheel is mounted. A floor member supported by the frame module includes a beverage, beverage component, or carbon dioxide container retaining assembly in an area between the main supporting wheel members.

A cooling and dispensing module supported by a cooling and dispensing module supporting assembly is located near the first end of the perimeter frame member. The cooling and dispensing module includes a cold plate for chilling a beverage and a dispensing unit including at least one dispensing valve. A substantially vertical side member extends at least partially around the perimeter member.

According to additional aspects the invention provides a mobile cart, comprising a frame module including a plurality of frame members. The frame members include a perimeter frame member having at least one segment, and a caster wheel supporting assembly attached in the vicinity of a first end of the perimeter frame member. At least one handle member is connected in the vicinity of the first end of the perimeter frame member.

Right and left main supporting wheels are supported by a main supporting wheel mounting assembly. The main supporting wheel mounting assembly includes at least one axle member. The at least one axle member is at least partially supported by the perimeter member. The main supporting wheels are located near a second end of the perimeter frame member.

At least one caster wheel is supported by the caster wheel supporting assembly. The caster wheel supporting assembly includes at least one axle upon which the at least one caster wheel is mounted. A floor member is supported by the frame module. A substantially vertical side module extends at least partially around the perimeter member. The side member includes at least one side member.

A liquid receiving and dispensing module holds a liquid to be dispensed. The liquid receiving and dispensing module maintains the liquid within it substantially at a desired temperature.

The objects and advantages of the present invention will become readily apparent those skilled in this art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

FIG. 6 represents a right rear partial cut-away perspective view of an embodiment of the floor member, two wheel housing members, beverage or beverage component tank retaining members, and an umbrella pole receiving member of the embodiment in FIGS. 1 and 2;

FIG. 7 represents an overhead view of an embodiment of the floor member of the present invention including five beverage, beverage component, or carbon dioxide tank retaining members;

FIG. 8 represents a side view of the floor member shown in FIG. 7;

DETAILED DESCRIPTION OF THE PREFERRED EMBODIMENTS

Figure 1:
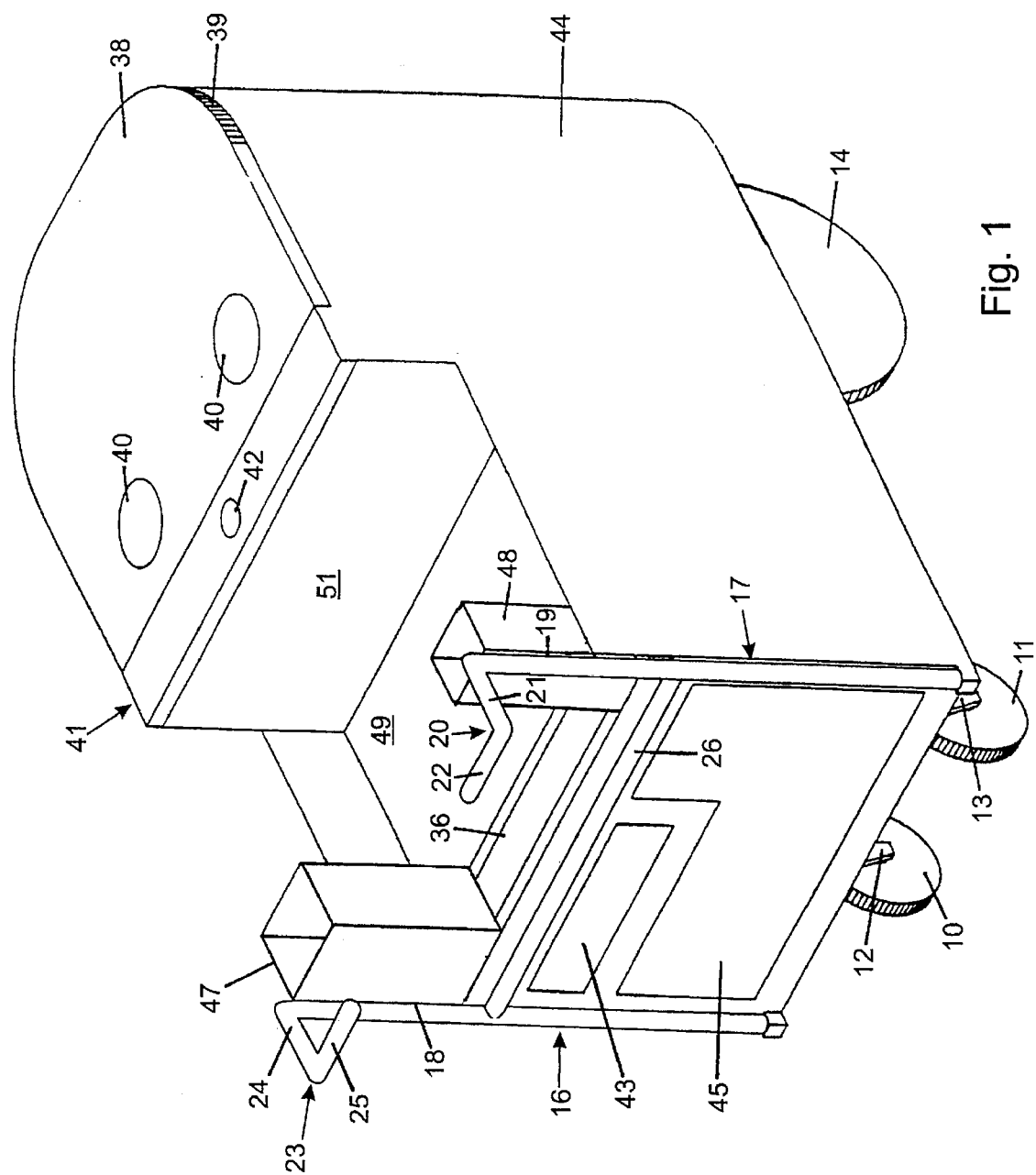
FIG. 1 represents a right rear perspective view of one embodiment of a mobile cart according to the present invention.

The present invention solves problems of known carts by providing a mobile cart which can dispense in a chilled and/or heated condition one or more beverages and/or other liquids stored in containers on the cart. The containers may be metal beverage tanks, plastic beverage containers, plastic beverage containers enclosed in plastic, cardboard lined with plastic or containing a plastic enclosure or other containers suitable for containing beverages, beverage components, and/or other liquids. The containers may be insulated and may also include apparatus to dispense the liquid stored inside.

In preferred embodiments, the present invention is mobile. Therefore, it cannot easily utilize a power source. Accordingly, the present invention preferably accomplishes its functions without utilizing a power source.

The present invention may also dispense beverages which are not pre-mixed but rather are stored as components in separate containers on the cart. The components require mixing prior to dispensing in a chilled condition. A cart for dispensing non-pre-mixed, or post-mix, beverages requires sources of water and electricity. The water and electricity sources may be stored on the cart or may be located at a location off of the cart. In the latter case, the cart will be connected to the water and power source. However, such a connection may limit the mobility of the cart.

Preferred embodiment of the present invention provide a highly flexible beverage cart specifically designed for its ability to maneuver and travel in a variety of settings. The cart may be used in indoor or outdoor areas, enabling the seller to go to the customer. Presently, the dispensing of fresh beverages is performed by an apparatus fixed to a bar and associated with a great deal of additional equipment and a power source. In settings where mobility is desired, beverages are contained in cans or bottles and stored in an ice chest which may be stored on a cart which may be pushed from one location to another.

The present invention solves problems existing in the art of beverage dispensing and mobile beverage delivery. The present invention can easily be manipulated within a crowd and quickly moved to an area where people may be congregating to encourage impulse sales of a fresh and ready to consume beverage product and therefore provides great advantages over known beverage dispensing equipment. As discussed in detail below, the present invention dispenses chilled beverages fresh from a tap without electrical and other connections and may also be moved easily between locations. The invention may also dispense heated beverages or other liquids without electrical and other connections and may also be moved easily between locations.

The capacity to offer several chilled and/or heated beverage or other liquid selections, such as soda, beer, bar mixers, juice, athletic drinks, sparkling water, coffee, tea, and/or soup enables the present invention to be used in any setting. For example, the present invention may be utilized at stadiums, arenas, theaters, fairs, flea markets, outdoor events, carnivals, amusement parks, concerts, golf courses, ballparks, supermarkets, club stores, food stores, especially for new product promotions, and garden parties at homes or country clubs. Unlike known carts which carry around beverages in cans and bottles, the present invention allows the beverages to be stored, possibly mixed, and dispensed just seconds prior to consumption by the consumer.

Figure 2:
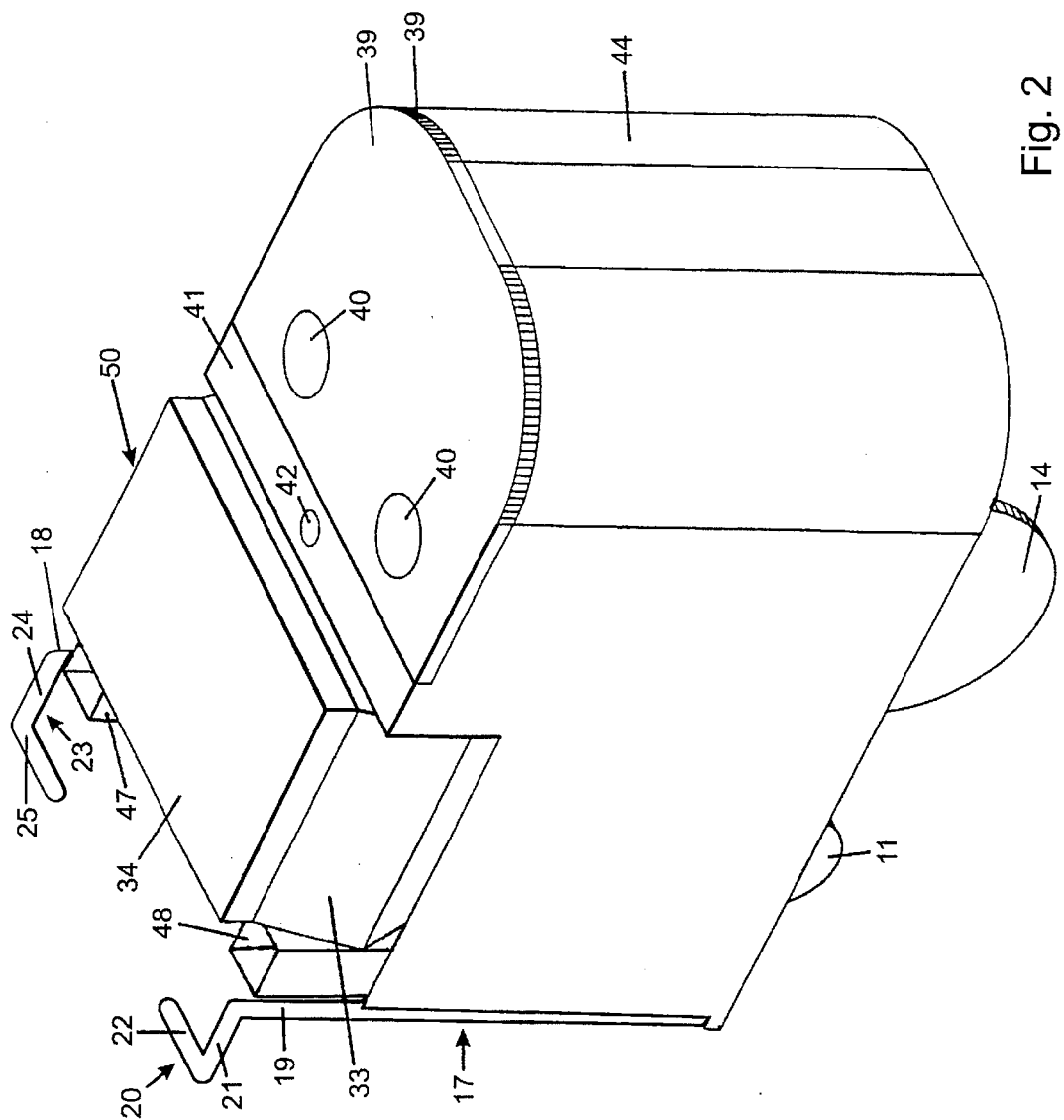
FIG. 2 represents a right front perspective view of the embodiment shown in FIG. 1 including an embodiment of a chilling and dispensing module.
Figure 5:
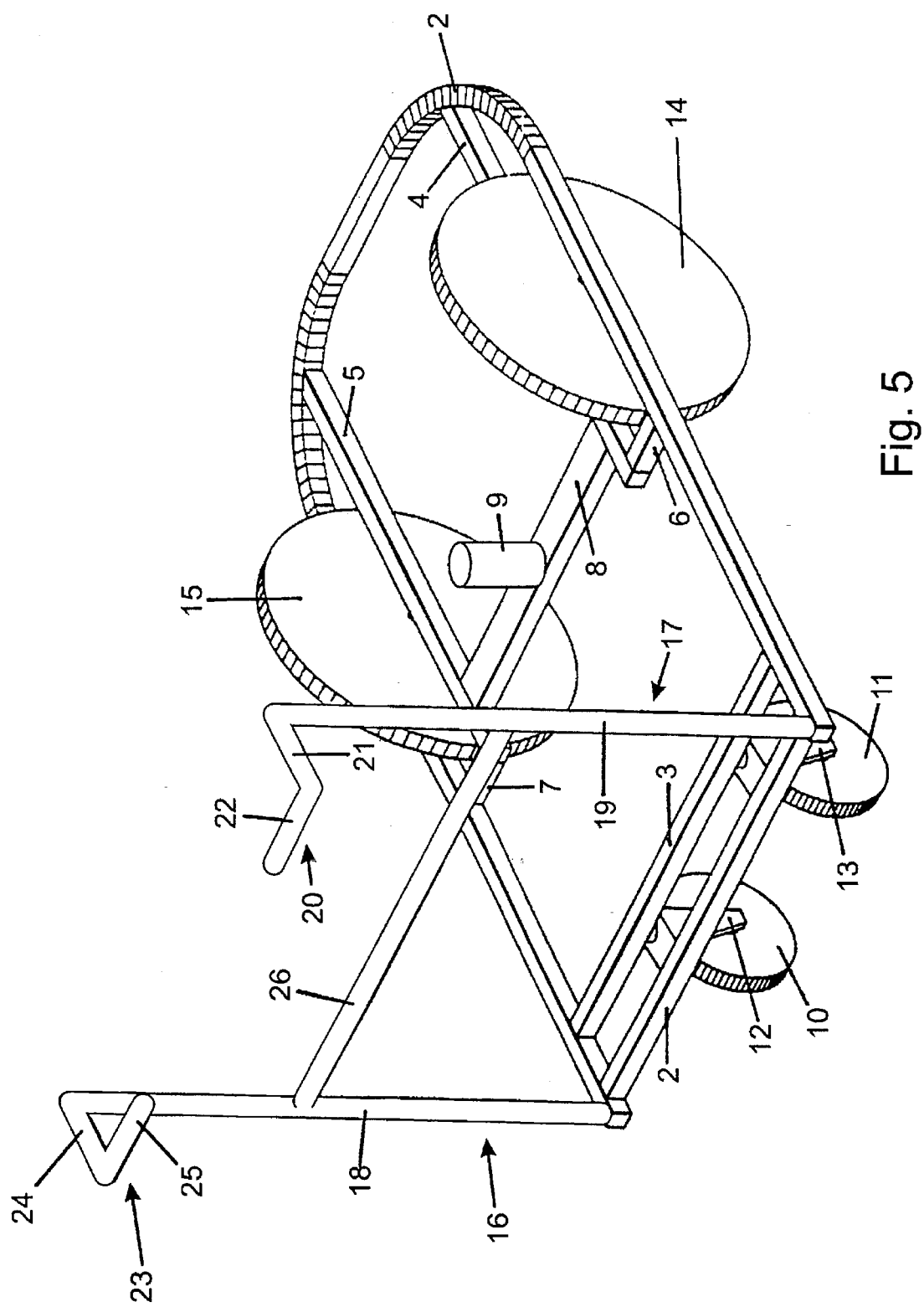
FIG. 5 represents a right rear partial cut-away perspective view of the embodiment shown in FIGS. 1 and 2, showing, among other things, a frame module, two main supporting wheel members, two caster wheel members, an umbrella pole receiving member, and two handle members.

The present invention, an embodiment of which is shown in FIGS. 1 and 2, provides a very user friendly beverage push cart which may be made of a variety of materials. FIG. 5 shows a frame module 1 which may support the components of the cart. The frame module may be made of metal, wood, plastic, composite materials, a combination of any of these materials, or any other suitable material(s). For example, the frame may be formed of one inch thick metal tubing.

The frame module preferably consists of a plurality of frame members. Alternatively, the frame module may be formed as a single, unitary frame member. Regardless of whether the frame module is formed as one piece or a number of pieces joined together, the frame module preferably includes a plurality of frame members.

The members preferably include a perimeter member 2. The perimeter member may be a U-shaped member as in the embodiment shown in FIG. 5. The perimeter member may be any other suitable shape and may include rounded or sharp corners. For example, the perimeter member may be a rectangle or square.

Preferably, in the vicinity of a first end of the perimeter frame member is mounted at least one caster wheel mounting assembly supporting member. In the embodiment shown in FIG. 5, the first end is the end of the cart near the handles of the cart. In such an embodiment, the first end may also be considered the rear end since the cart would typically be pushed in a direction opposite of the direction that the handles face.

As shown in FIG. 5, the frame module may also include two caster wheel mounting assembly supporting members 3 and 3a. Alternatively, the frame module 1 may include only one caster wheel mounting assembly supporting member. Further, the frame module 1 may not include any caster wheel mounting assembly supporting members if the caster wheel mounting assembly(s) is attached to the perimeter frame member 2.

The present invention may also include at least one caster wheel member. The embodiment shown in FIG. 5 includes two caster wheel members 10 and 11. The caster wheel(s) preferably are mounted on the frame module with caster wheel mounting assembly(ies). In an embodiment including only one caster wheel, the caster wheel preferably is mounted to the caster wheel mounting assembly(ies) supporting member.

The embodiment shown in FIG. 5 includes two caster wheel mounting assemblies. The caster wheel mounting assemblies in the embodiment shown in FIG. 5 each include clevis member 12 and 13. The clevis member(s) may be attached to the perimeter frame member 2 or the caster wheel mounting assembly support member(s) using nut and bolts, welding, screws, nails, adhesive, or by any other suitable method. In one embodiment, a bolt may extend from the clevis member(s) and be secured to the perimeter frame member 2 or the caster wheel mounting assembly supporting member(s) with a nut.

Each caster wheel may be mounted on an axle (not shown) supported between the arms of the clevis member. The caster wheel mounting assembly may alternatively include a single arm member rather than the U-shaped clevis. The single arm may include an axle on which the caster wheel(s) is mounted. As with the clevis member, the single arm member may be mounted near the perimeter frame member or the caster wheel mounting assembly mounting member(s). The caster wheels may be mounted in any manner which allows them to rotate. The caster wheels may even be located at another location on the cart.

The caster wheel(s) preferably are smaller diameter wheels than the main supporting wheels, which are described below. For example, the caster wheel(s) may be eight inch diameter solid plastic lawn service swivel wheels with nylon bearings. Alternatively, the caster wheel(s) may be eight inch diameter solid rubber swivel wheels. Regardless of what type of wheels are used for the caster wheels, as stated above, the caster wheels preferably are mounted so that they or the caster wheel mounting assemblies rotate and allow the operator to steer the cart. The caster wheels may help to increase the maneuverability of the cart through stadiums, indoor arenas, and any other area where the cart is used.

The frame module may also include a main supporting wheel mounting assembly. In the embodiment shown in FIG. 5, the main supporting wheel mounting assembly includes main supporting wheel mounting members 4 and 5. The mounting members 4 and 5 preferably are attached to the perimeter frame member near the second, or front, end of the cart. As shown in FIG. 5, the second end of the cart is the end which faces the direction which typically faces the direction a cart as shown in FIG. 5 would be pushed.

The main supporting wheel mounting members 4 and 5 may be attached near the apex of the U-shape of the perimeter frame member 2, as shown in FIG. 5. In an embodiment of the invention including a rectangular perimeter frame member, the main supporting wheel mounting members may be attached near the corners of the perimeter. The support members 4 and 5 may be attached to the perimeter frame member by welding, screws, nuts and bolts, adhesive, or any other suitable method. Alternatively, the support members 4 and 5 may be formed at the same time and as a single unit with the perimeter frame member.

The other ends of the main supporting wheel mounting members 4 and 5 may be attached to cross members 6 and 7. The cross members preferably are attached to the ends of the main supporting wheel mounting members 4 and 5 and to the arms of the perimeter frame member 2. In an alternative embodiment, the main supporting wheel mounting members 4 and 5 may extend between the apex of the perimeter frame member 2 and one of the caster wheel mounting assembly supporting members 3 and 3a.

Figure 20:
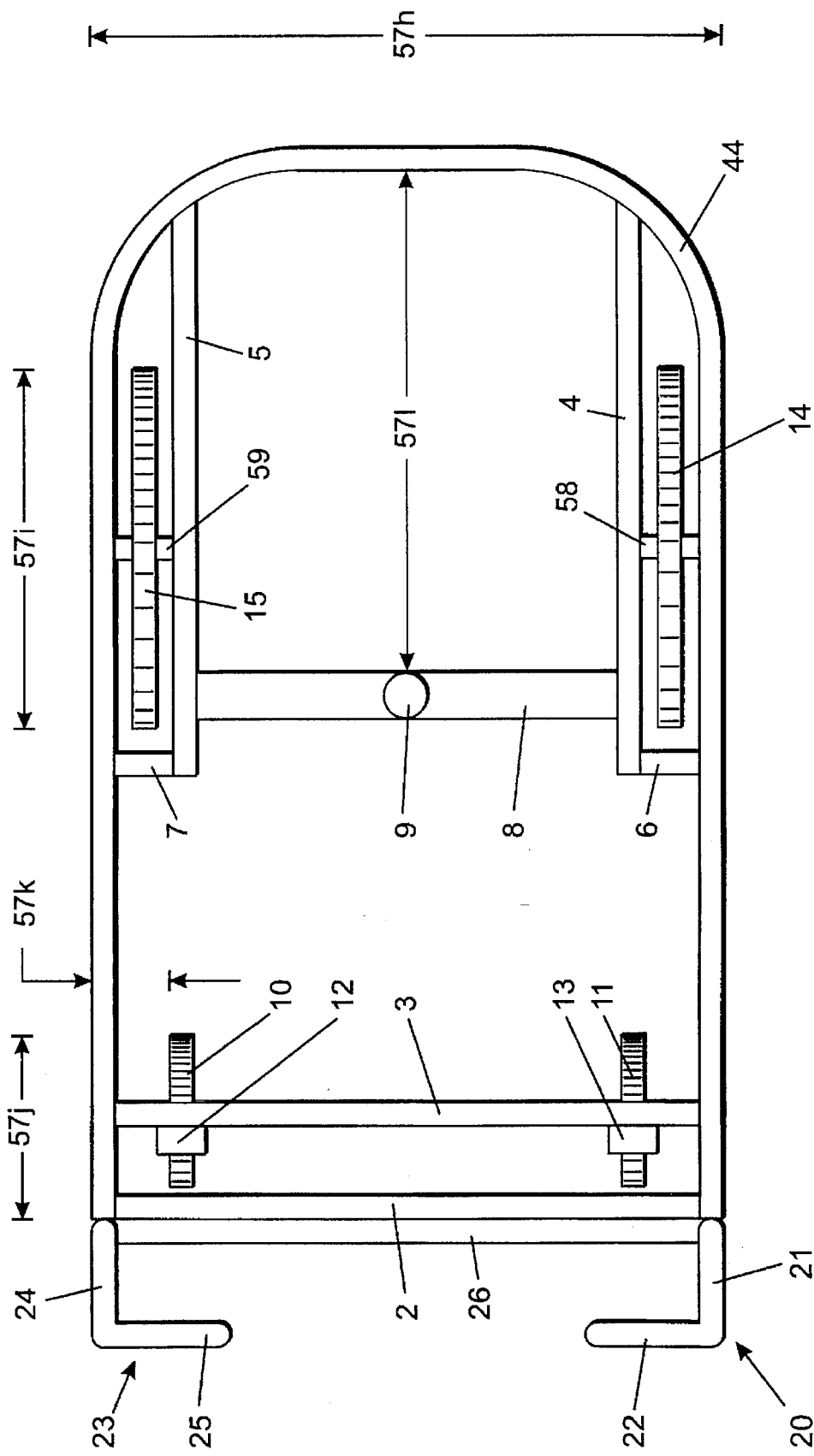
FIG. 20 represents an top cross-sectional view of the embodiment shown in FIG. 5.
Figure 21:
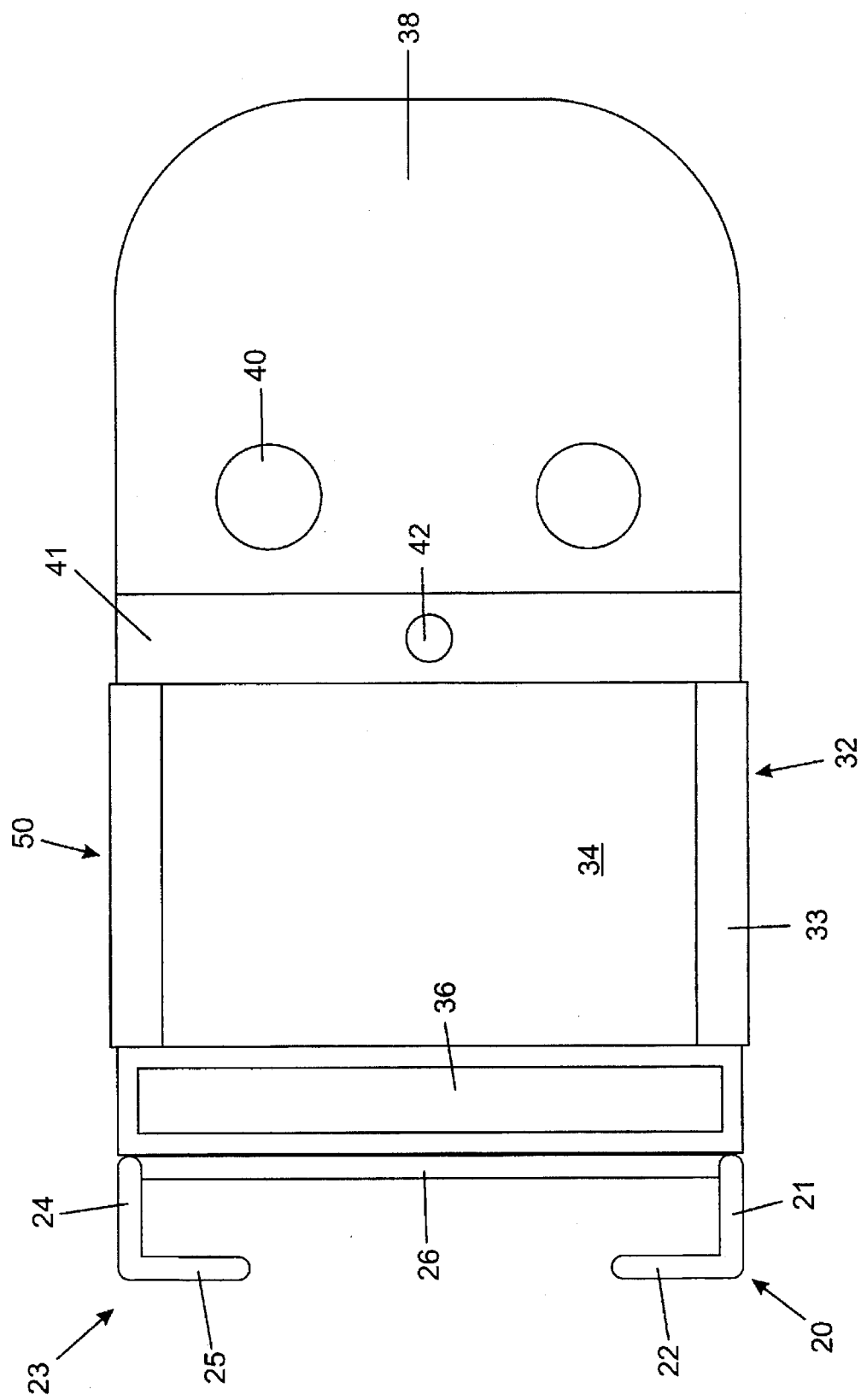
FIG. 21 represents an overhead view of the embodiment of the invention shown in FIGS. 13–15, 17, and 18.

The main supporting wheel members 14 and 15 may be mounted on axles 58 and 59, respectively, shown in FIG. 20, attached between the arms of a U-shaped perimeter member and the main supporting wheel mounting members. The axles preferably are situated such that the wheels do not touch any of the frame members. In an alternative embodiment, a single axle may be mounted between the arms of the perimeter frame member and the wheels mounted on the axle. Such an embodiment would not include the main supporting wheel mounting members.

The main supporting wheels 14 and 15 preferably are capable of supporting the weight of the cart and all of the components attached thereto. Preferably, the main supporting wheels are bicycle wheels, although other types of wheels may be employed. Such wheels can support up to 300 pounds. Although bicycle wheels come in a variety of sizes, any of which may be used with the present invention, the preferred size is sixteen inches in diameter. Bicycle wheels are typically made of rubber, and include metallic, plastic, or composite wheel rims and spokes.

The frame module may also include one or more cross supporting members. The embodiment shown in FIG. 5 includes one cross supporting member 8. The cross supporting member(s) may provide support and stability to the cart as well as components of the cart and to the main supporting wheels 14 and 15. The cross supporting member 8 may be attached between the sides of the perimeter frame member 2 or, as in the embodiment shown in FIG. 5, between the main supporting wheel mounting members 4 and 5.

As discussed below, the present invention may also include an umbrella (not shown). The umbrella may be supported by umbrella supporting assembly. In the embodiment shown in FIG. 3, the umbrella supporting assembly includes an umbrella pole receiving member 9 mounted on the cross supporting member 8. The umbrella pole receiving member 9 may be a cylindrical member fixed to the cross supporting member 8. Alternatively, the umbrella pole receiving member 9 may also include a cup-like member.

In order to provide a way of imparting motion to the cart, at least one handle member may be attached to the frame module near the first end of the perimeter frame member. In the embodiment shown in FIG. 5, the cart includes two handle members 16 and 17. The handle members shown in FIG. 5 each include an upright supporting and attaching member 18 and 19, and a hand grip member 20 and 21.

The handle members may be attached to the frame module in various locations. In the embodiment shown in FIG. 5, the handle members are attached near the ends of the arms of the perimeter frame member. In other embodiments, the handle members may be attached to the caster wheel mounting assembly supporting members 3 and 3a. The handle members may be attached to the cart with welding, adhesive, screws, nuts and bolts, or any other suitable method. The handle members may even be formed along with the frame module as a single unit.

Figure 3:
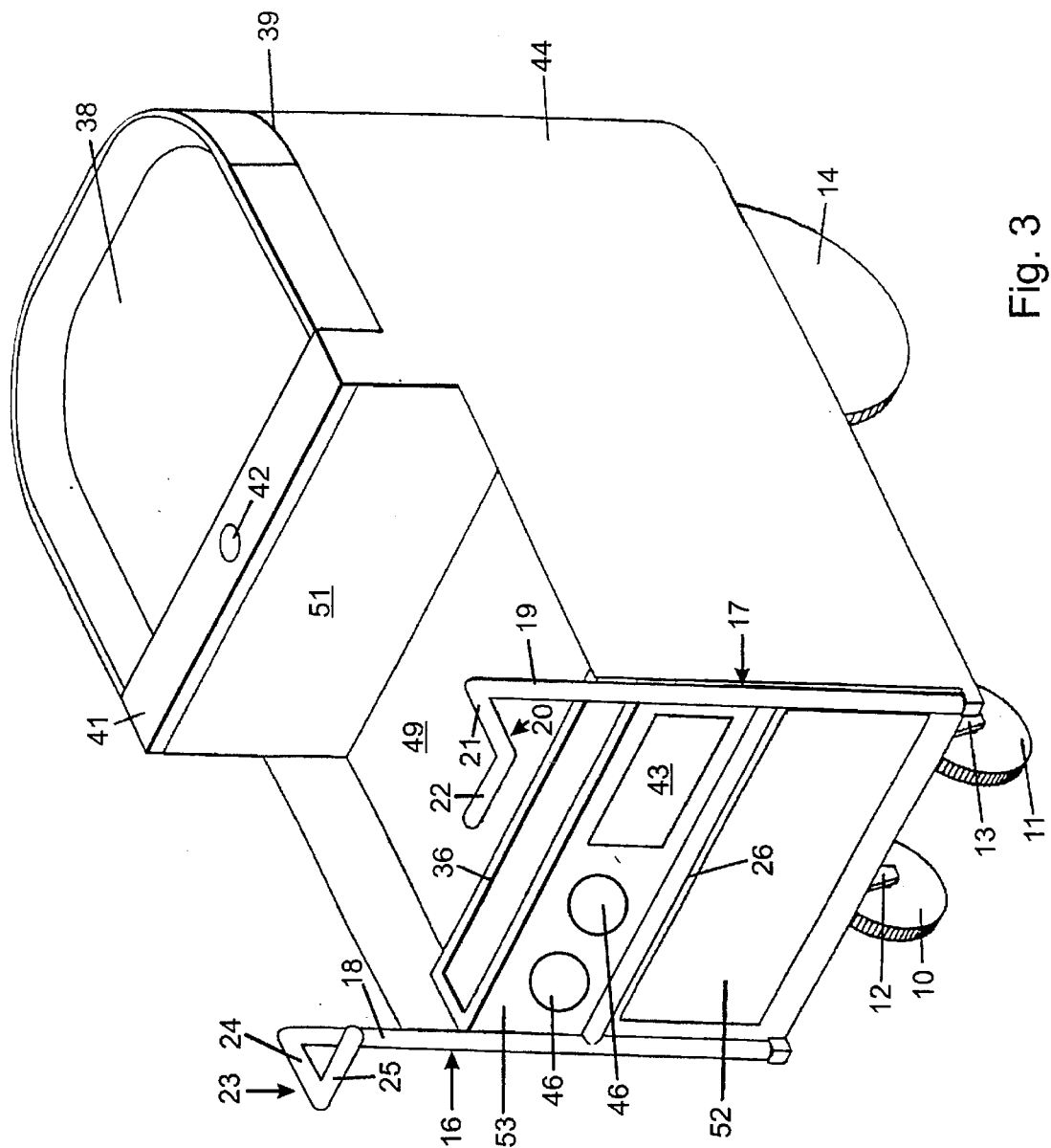
FIG. 3 represents a right rear perspective view of another embodiment of the present invention.

In the embodiment shown in FIG. 3, the handle grip members include two sections. A first section 21 and 24 may be attached to the upright handle supporting and attaching member and a second section 22 and 25 may be attached to the first section. In such an embodiment, it is the second section that an operator's hands may engage to apply a pushing force to the cart to move the cart.

The second, hand engaging section may be attached directly to the supporting and attaching member(s) 18 and 19. Alternatively, the operator may push directly on the supporting and attaching member(s) 18 and 19. A cross brace member 26 may be attached to the upright supporting and attaching members 18 and 19 as in the embodiment shown in FIG. 5 to provide additional support and structural strength to the handle members. The cart may have handlebar grips such as the type used on bicycles for easy push control by a single operator.

The handle member(s) may include a cable braking system (not shown) such as the type used on bicycles. The braking system may engage the main supporting wheels, the caster wheels, or both. The cables of the braking system may be attached to the members of the frame module, may be secured within the frame members, or attached to the cart by any other suitable method. The caster wheels may also have a locking device to secure the cart in place. Any known locking device may be used.

The components of the cart may be supported by a floor member 27. The floor member 27 may be directly supported by the upper surface of the frame module or by supporting members extending upwardly from the frame module. The floor member 27 preferably has a perimeter approximately matching the perimeter of the frame module. The floor member 27 may be made of plastic, metal, wood, or composite materials, a combination of these materials, or any other suitable materials. The floor member 27 may be attached to the frame module using welding, adhesive, screws, nuts and bolts, nails, or any other suitable method.

The floor member 27 preferably includes portions formed therein or cut out providing space for the main supporting wheels to extend through. The main supporting wheels may be covered by main supporting wheel housing members 28 and 29. The main supporting wheel housing members 28 and 29 may be fixed to the floor member 27 using welding, adhesive, screws, nuts and bolts, nails, or any other suitable method and preferably provide sufficient clearance to allow the main supporting wheels 14 and 15 to turn freely in all conditions. Although the wheel housing members 28 and 29 in the embodiment shown in FIG. 6 are rounded, the wheel housing members may be rectangular box shaped or any other shape. The wheel housing members 28 and 29 may also be made of plastic, metal, wood, or composite materials, a combination of these materials, or any other suitable materials.

The surface of the floor member 27 may include a beverage, beverage component, or carbon dioxide container retaining assembly. As shown in FIGS. 6, 7, 9, and 10, the beverage or beverage component container retaining assembly may comprise at least one depression 30 formed in the surface of the floor member. The shape of the depression(s) preferably is about the same as the shape of the base of containers used to store beer, and soda components. Additionally, the depression(s) may accommodate a container holding carbon dioxide. In the embodiment shown in FIGS. 6, 9, and 11, the floor member includes four beverage, beverage component, or carbon dioxide container retaining members.

The floor member may include more or less container retaining depressions. For instance, the embodiment shown in FIGS. 7 and 10 includes five depressions. Four of the depressions 30a shown in FIGS. 7 and 10 preferably are for receiving and retaining upright beverage, beverage component, carbon dioxide tanks or other containers. In the embodiment shown in FIGS. 7 and 10, the depressions for holding the beverage containers are not separated by walls, but rather are joined to form one big depression. The perimeter of the large depression is substantially in the shape of the beverage containers.

The other depression 30b may accommodate a carbon dioxide tank in a reclining position. The depression 30b is shown from the side in FIG. 8. The depression 30b preferably is angled at about 30° to ensure that the carbon dioxide tank will fit inside the cart. However, the angle of the depression 30b may be varied, depending upon the size of the cart and the size of the tank, among other factors.

The floor member may also include a raised area 54, as in the embodiment shown in FIGS. 7 and 8. The raised area may help to position components of the cart, such as waste water tank 37, side member 38, and/or front member 45, among others.

The beverage component container retaining assembly may include, in addition to or in place of the depressions, at least one retaining ridge (not shown) formed on or attached to the surface of the floor member. The beverage component containers may be set within the ridges.

Regardless of what structure is provided for retaining the beverage containers, in embodiments including beverage containers, the beverage or beverage component retaining assembly and/or the floor member may also include at least one securing member (not shown) for securing the containers to the floor member. The securing members may include straps, buckles, strings, and/or any other members suitable for securing the containers to the floor member and/or other component of the cart.

The floor member may also include an umbrella pole receiving passage 31, as shown in FIGS. 6 and 7 through which an umbrella pole may pass in an embodiment of the cart which includes an umbrella. The umbrella pole receiving passage 31 comprises part of the umbrella mounting assembly, along with, among other elements, the umbrella receiving member 9 attached to a member of the frame module described above. In the embodiment shown in FIG. 5, the umbrella pole receiving member is attached to cross member 8 of the frame module.

The beverage product, beverage product component, and/or carbon dioxide containers which may be located in the beverage cart may be made of stainless steel, plastic, cardboard lined with plastic or holding a plastic container, or any other suitable container. Preferably, stainless steel tanks are used. Each container typically holds about five gallons of beverage. Such tanks are shown in FIGS. 11-19. In FIGS. 11-19, the beverage tanks are identified as 55 and the carbon dioxide tank as 56. Although the embodiments shown in FIGS. 11-19 hold five gallons of beverage, any size beverage or beverage component tanks may be used with the present invention.

Typically, stainless steel beverage and beverage component tanks have "In" and "Out" valves located on top of each tank. If the cart is dispensing soda or soda water, the $CO_2$ component of the beverage may released into the "in" valve while product, or syrup making up the soda, may released or forced through the "Out" valve. Completely sealed and under pressure, the containers may be part of a closed beverage system where product is drawn through a product valve.

The containers included in an embodiment which dispenses only soda may include a twenty pound $CO_2$ tank and three five gallon pre-mix beverage tanks secured in the container retaining depressions, as in the embodiment shown in FIGS. 6, 8, 11, 13-15, and 17-19. Although, in other embodiments, such as those shown in FIGS. 7, 10, 12, and 16, four five gallon beverage tanks and one $CO_2$ tank may be mounted on the cart. Further, in the embodiments shown in FIGS. 21-25, a cart according to the present invention may include a narrow design in which preferably only two similarly sized beverage tanks and one $CO_2$ tank are mounted on the cart. Such a narrow design will increase the maneuverability of the cart so as to be more useful in certain settings.

As discussed above and seen in the Figures, typically one $CO_2$ tank included in the beverage cart. The $CO_2$ may be utilized to push the beverage through the containers, lines, cold plate and dispensing valves at a pressure of forty pounds per square inch.

In an embodiment including four or five tanks, all of the tanks, which may include three or four beverage product tanks and one $CO_2$ tank, may be secured in the cart by the beverage container retaining assembly. In an embodiment in which the beverage container retaining assembly includes depressions, the depressions may be form fitted to tightly hold the containers in place. Additionally, a two inch nylon strip of velcro may be wrapped about the upper middle portions of the containers to hold them tightly in place to thereby resist spilling as the operator moves the cart about.

Figure 9:
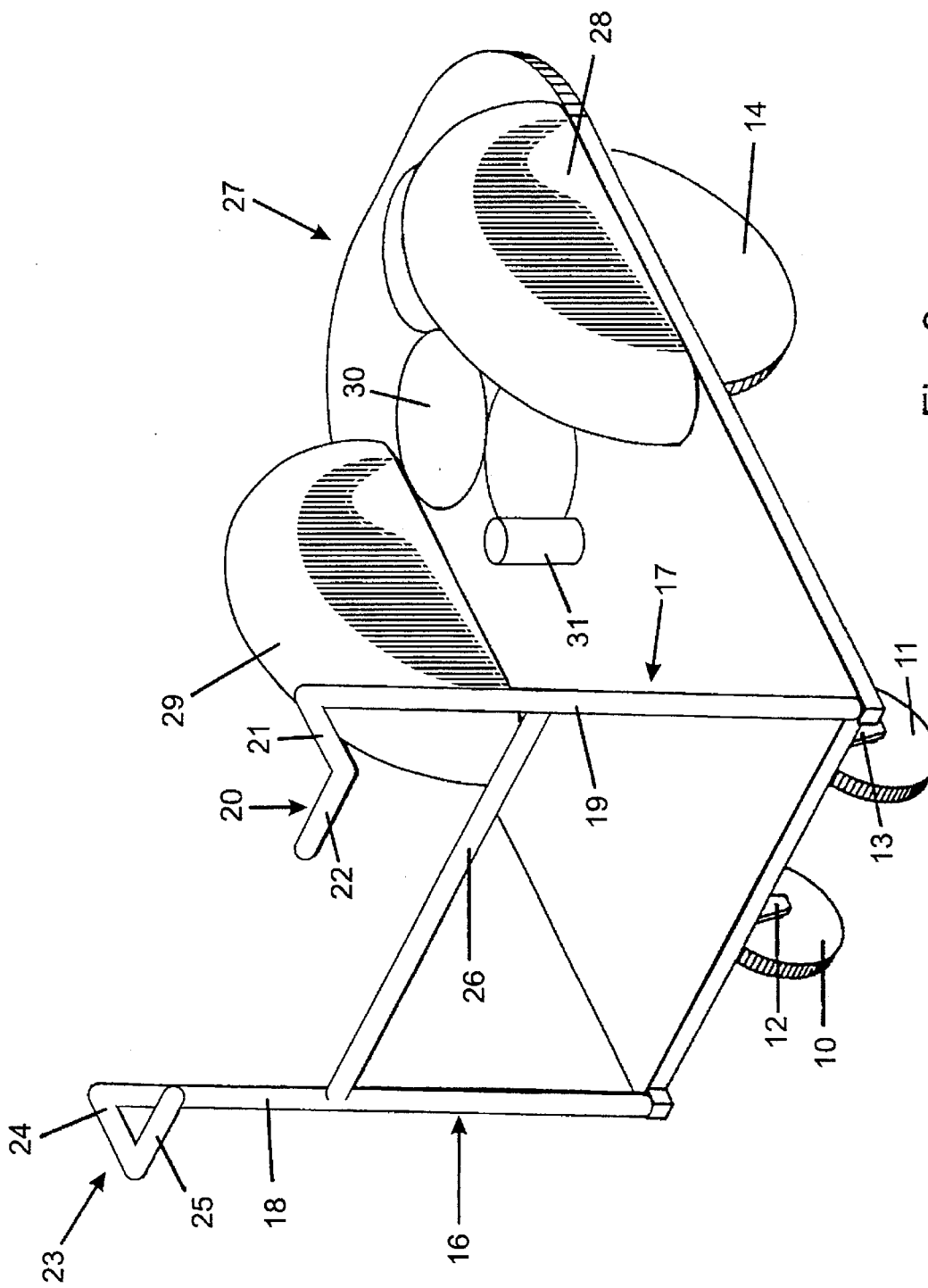
FIG. 9 represents a right rear partial cut-away perspective view showing the embodiment of the floor member shown in FIG. 6 mounted on the embodiment of the frame module shown in FIG. 5.

FIG. 9 shows an embodiment of the cart in which the floor member 27 shown in FIG. 6 has been placed in its proper position on the frame module. The embodiment includes main supporting wheel housing members 28 and 29, two handle members 16 and 17, an umbrella pole receiving member 9, and four beverage, beverage component, or carbon dioxide container retaining members 30. This embodiment is adapted to receive three beverage tanks and one $CO_2$ tank.

Figure 10:
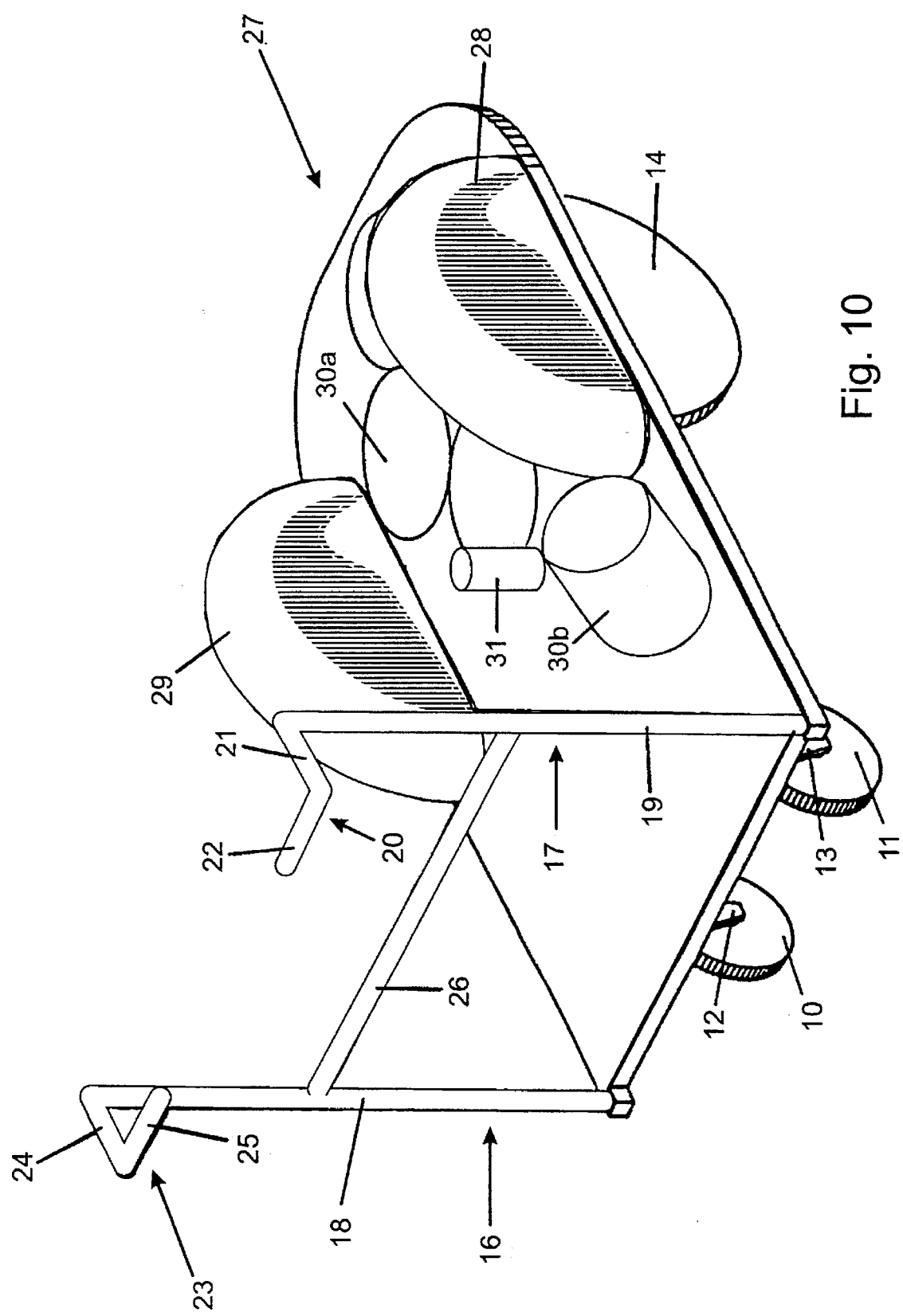
FIG. 10 represents a right rear partial cut-away perspective view of the embodiment of the floor member shown in FIG. 7 mounted on the embodiment of the frame module shown in FIG. 5.

FIG. 10 shows an embodiment of the cart in which the floor member 27 shown in FIGS. 7 and 8 has been placed in its proper position on the frame module. The embodiment shown in FIG. 10 includes main supporting wheel housing members 28 and 29, two handle members 16 and 17, an umbrella pole receiving member 9, and five beverage, beverage component, or carbon dioxide tank retaining members 30. This embodiment is adapted to receive four beverage tanks and one $CO_2$ tank.

Figure 11:
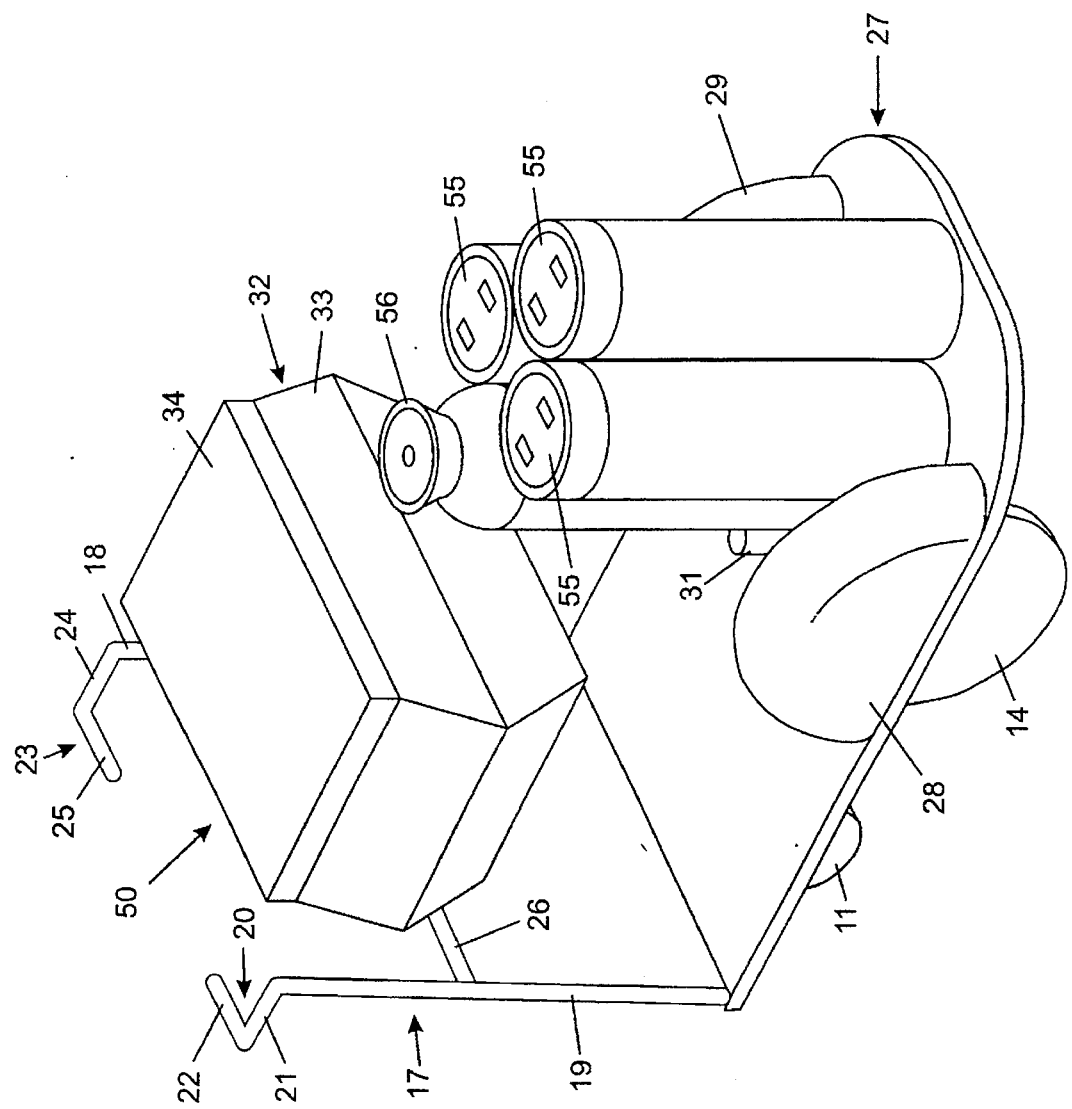
FIG. 11 represents a right front partial cut-away perspective view of the embodiment of the invention shown in FIG. 9, including three beverage holding tanks and a carbon dioxide tank mounted in an embodiment of the beverage or beverage component tank retaining assembly and an embodiment of a cooling and dispensing module.
Figure 12:
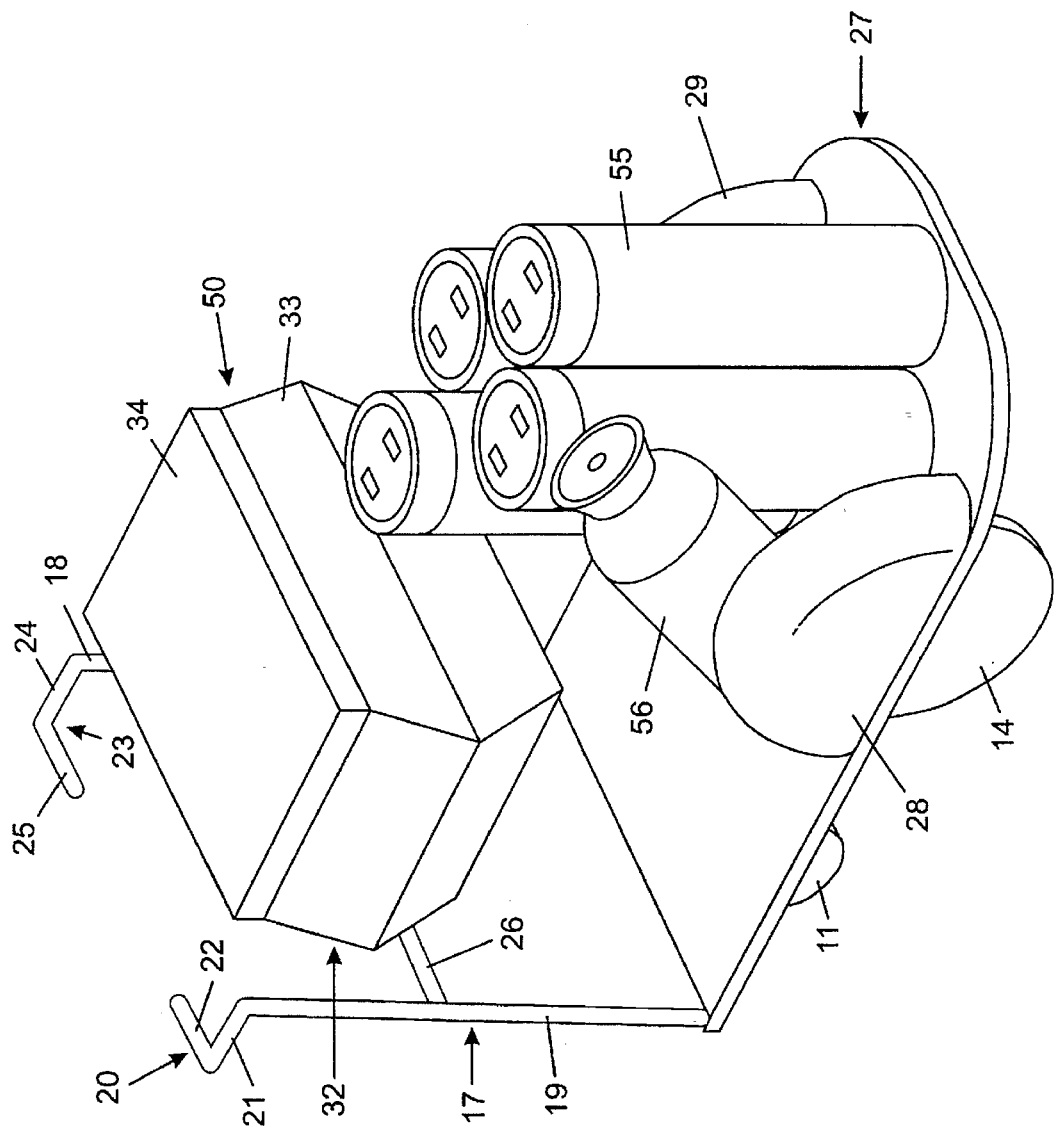
FIG. 12 represents a right front partial cut-away perspective view of the embodiment shown in FIG. 10, including four beverage or beverage component tanks and a carbon dioxide tank mounted in an embodiment of the beverage component holding tank retaining assembly and an embodiment of a cooling and dispensing module.
Figure 13:
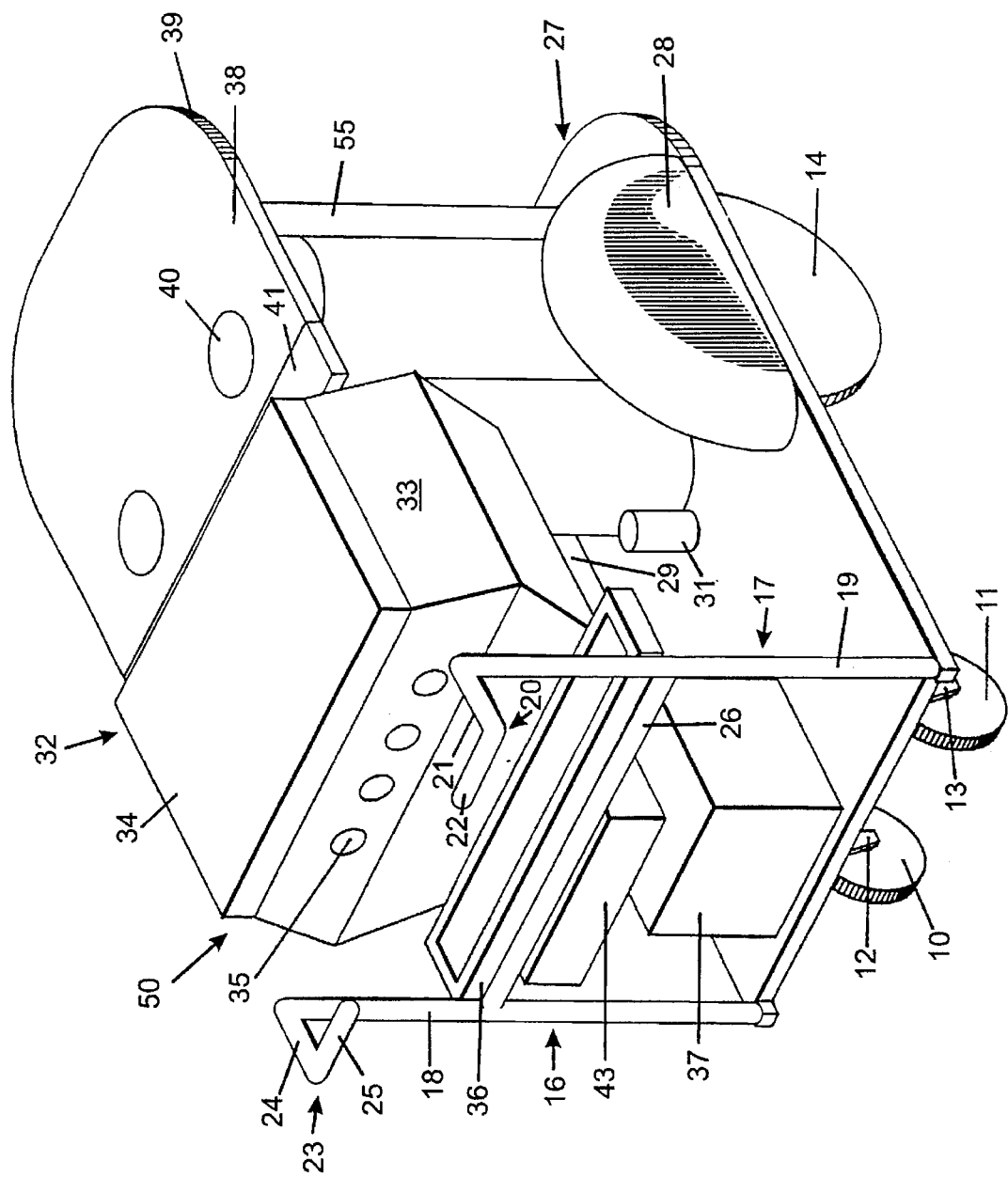
FIG. 13 represents a right rear partial cut-away perspective view of the embodiment shown in FIG. 11 including an embodiment of a lid member, an embodiment of a drip tray, an embodiment of a cash box, an embodiment of a cross member, and an embodiment of a liquid waste tank.
Figure 14:
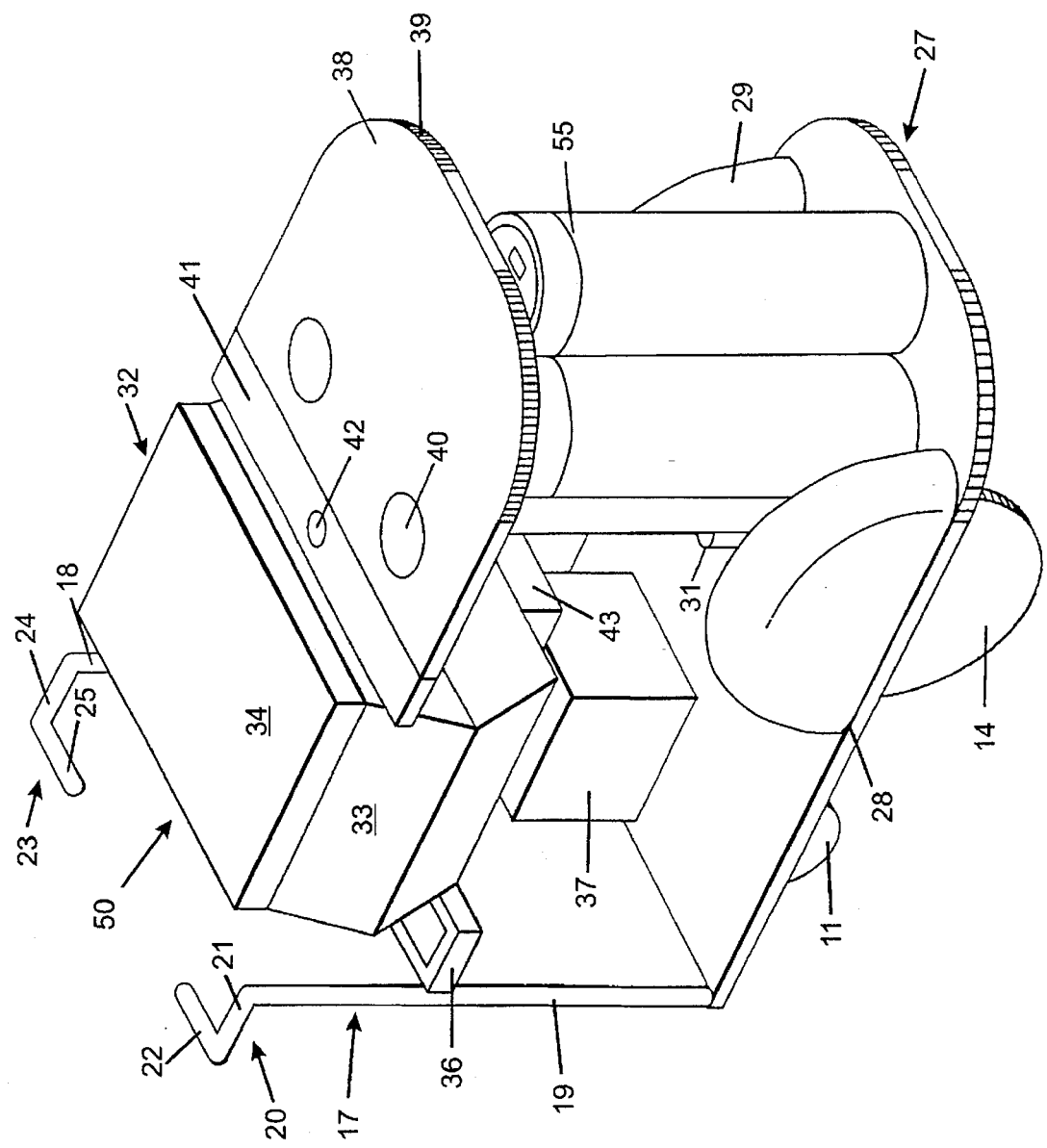
FIG. 14 represents a right front partial cut-away perspective view of the embodiment of the invention shown in FIG. 13.
Figure 15:
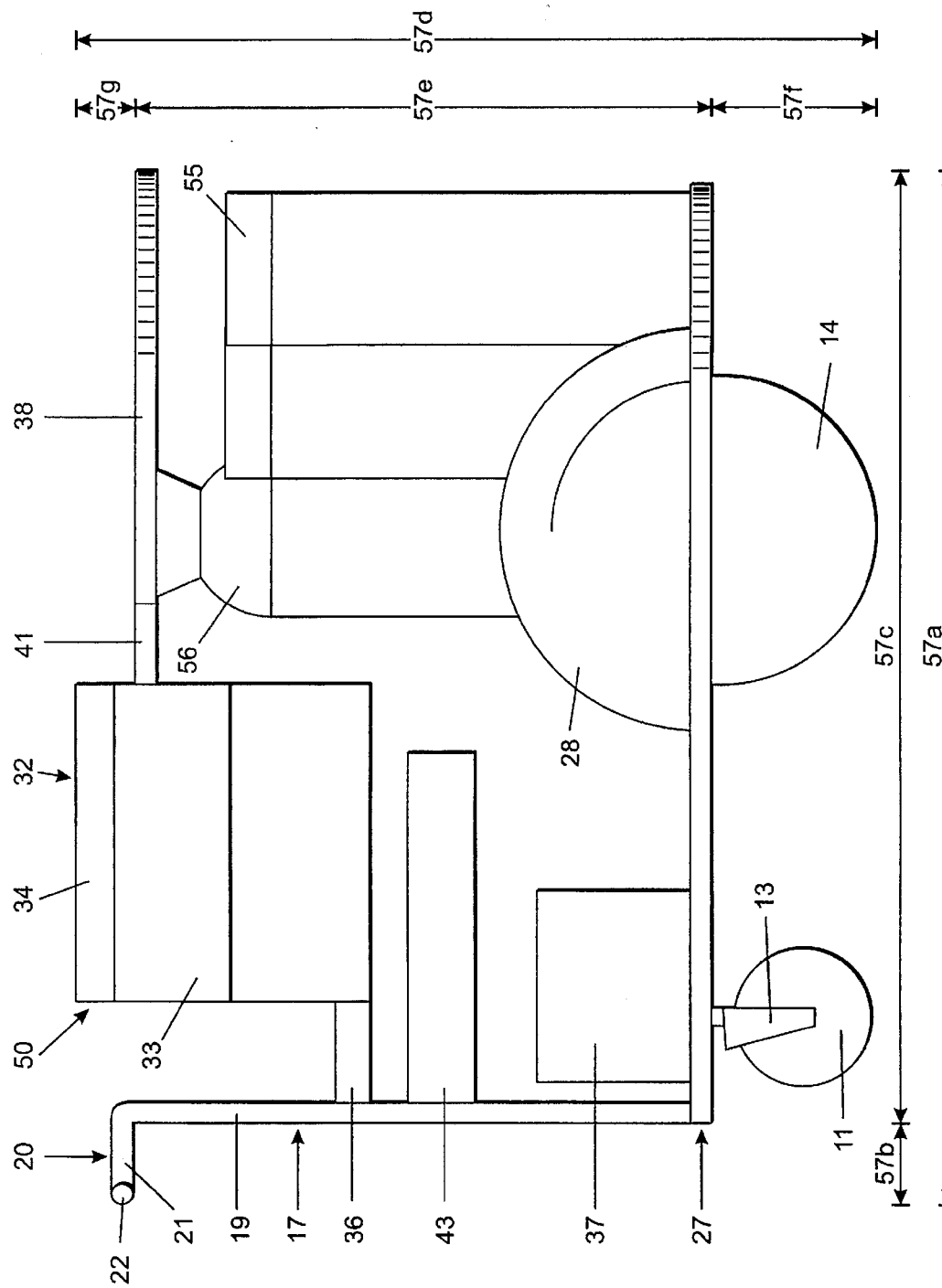
FIG. 15 represents a side view of the embodiment of the present invention shown in FIGS. 13 and 14.

FIGS. 11 and 12 show the embodiments of the present invention in which, respectively, three or four beverage or beverage component containers 55 and one carbon dioxide container 56 have been placed within the beverage component retaining depressions 30.

A cooling and dispensing module 50 has also been mounted to the cart in the embodiment shown in FIGS. 11 and 12. The cooling and dispensing module 50 preferably is located near the first end of the perimeter frame member and the handle member(s). The cooling and dispensing module 50 may include a cooler unit 32. The cooler unit 32 preferably houses a cold plate (not shown) and receives ice to chill the beverage(s) as it passes through the cold plate. The cooling and dispensing module preferably also includes at least one dispensing valve 35. The dispensing valve(s) 35 may be mounted on the cooler unit 32.

The cooler unit 32 may be made of insulated plastic, metal, or any other suitable material. The cooler unit 32 preferably is comprised of a box 33 with a lid member 34. In the embodiment shown in FIGS. 11 and 12, the cooler unit 32 is located at the end of the frame module near the handle members 16 and 17 of the cart. The cooling and dispensing module 50 may be supported by a cooling and dispensing unit support assembly.

The cooling and dispensing module support assembly may be made of a frame formed from a material similar to the material used to form the frame members of the frame module. The cooling and dispensing module support assembly may also include a supporting surface 49 similar to the floor member to directly support the cooler unit. The supporting surface 49 may be supported by other members (not shown) of the cooling and dispensing module support assembly. The sides of side member 44 may extend up above the upper surface of the supporting surface 49 so as to also help to maintain the cooling and dispensing module in place. A back member 51 may also help to maintain the cooling and dispensing module in the proper position and also help to support cross member 41 and cart lid member 38. In an alternative embodiment, the cooling and dispensing module may be supported by the other components of the cart, such as the cash box, drip tray, waste water tank, among others.

The process of chilling the beverage from ambient temperature to as low as approximately 36°–38° F. preferably is accomplished by utilizing $CO_2$ to push the beverage through a series of coils enclosed in a cast aluminum plate, commonly known as a cold plate (not shown). The cold plate enables beverages to be dispensed at a temperature as low as between about 36 and about 38 degrees Fahrenheit. At this temperature, the beverage is extremely fresh and very desirable for consumption.

The cold plate preferably is about eighteen by about eleven inches and about three inches deep. Although, different size cold plates may be used. In a cold plate of the size described above, the coiled tubing through which the beverage passes is about 150 feet long. The tubing may be made of stainless steel, plastic, or any other suitable material. The cooling coil is enclosed within the plate.

The plate is placed in the cooler unit and then covered with ice. The ice chills the aluminum plate and coils to as low as about 34 degrees Fahrenheit. The cold plate preferably will usually sufficiently chill the beverage moving through it and, therefore, cannot be overdrawn as long as there is an ample supply of ice covering the cold plate.

Figure 16:
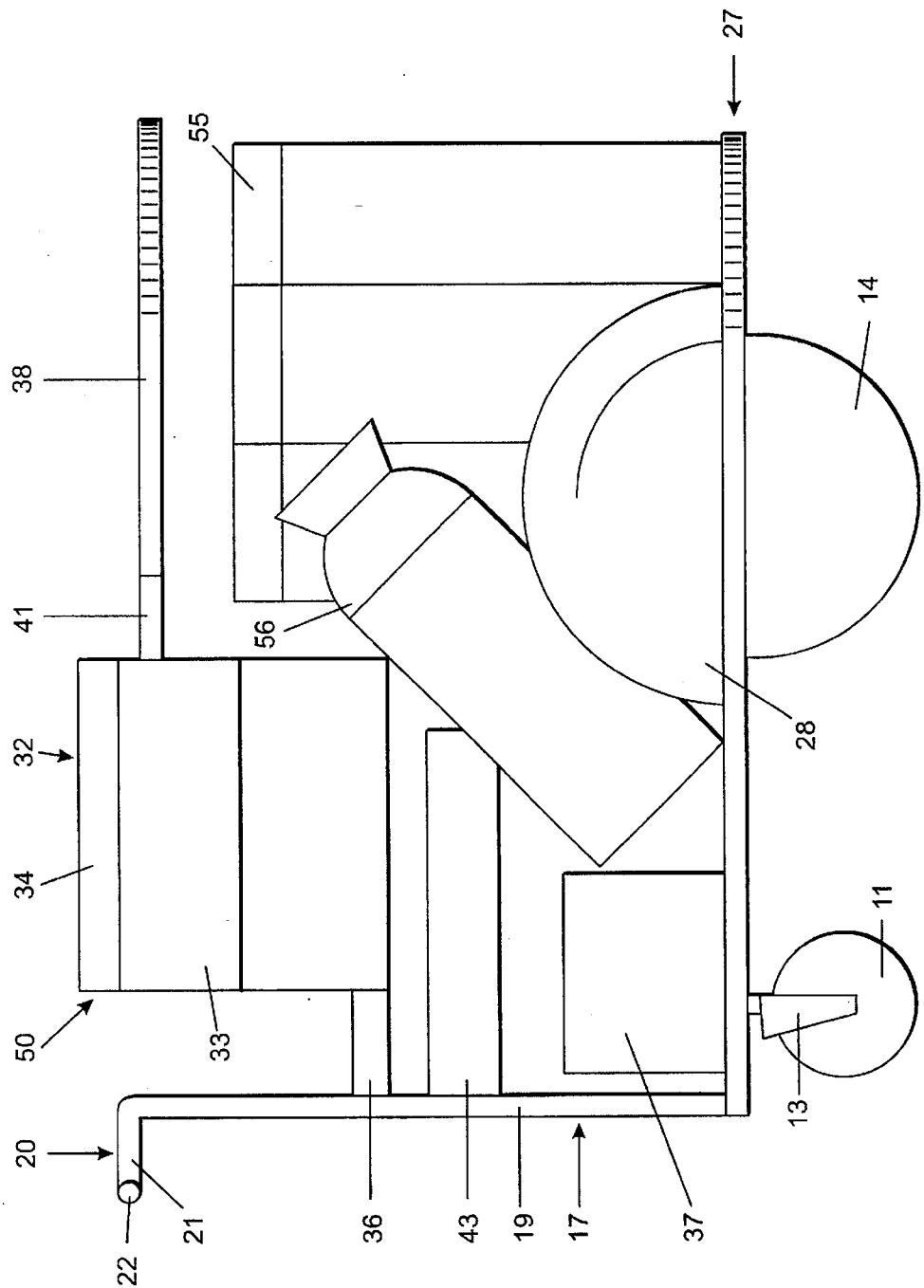
FIG. 16 represents a side view of the embodiment of the present invention shown in FIG. 12, including an embodiment of a lid member, an embodiment of a drip tray, an embodiment of a cash box, an embodiment of a cross member, and an embodiment of a liquid waste tank.
Figure 17:
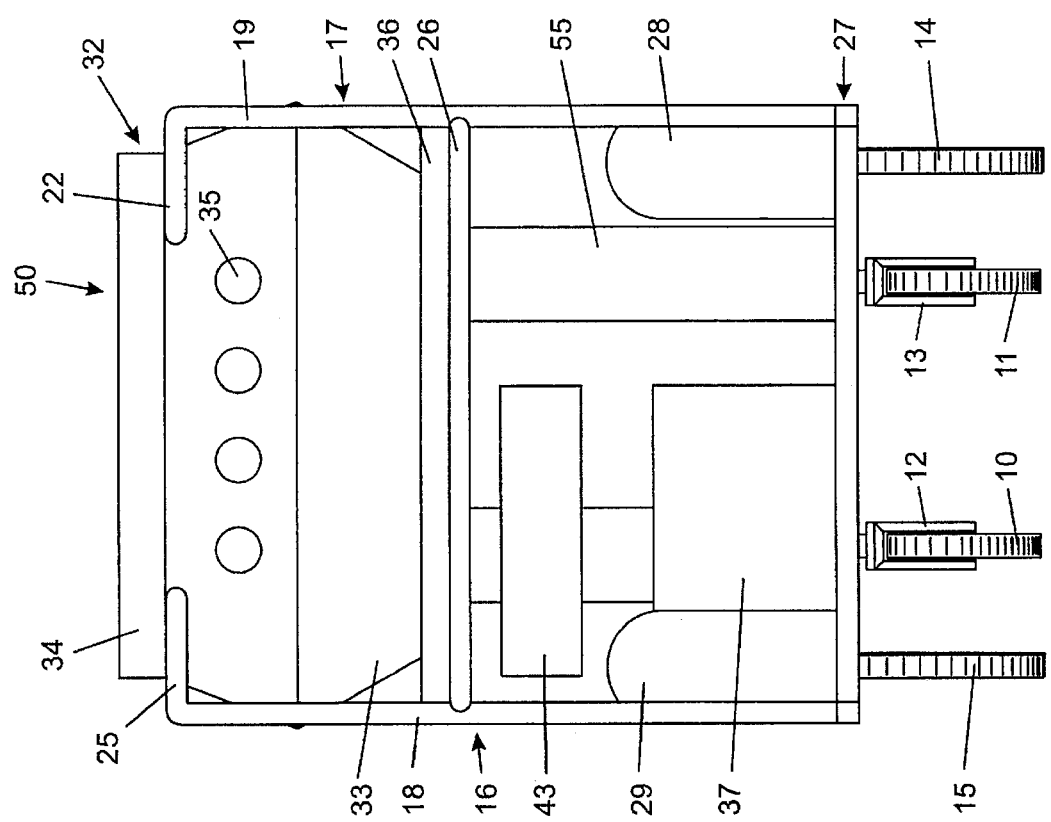
FIG. 17 represents an end view of the embodiment shown in FIGS. 13–15.
Figure 18:
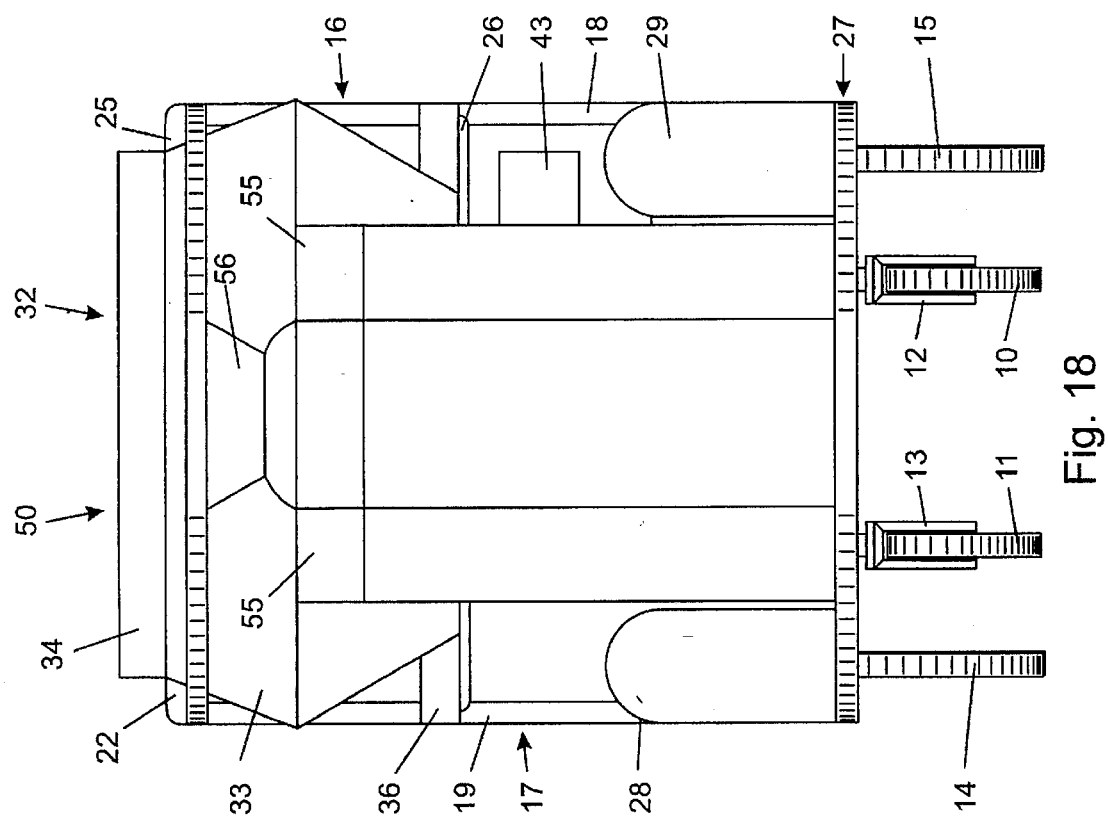
FIG. 18 represents an end view of the embodiment of the invention shown in FIGS. 13–15 from the opposite end as shown in FIG. 17.
Figure 19:
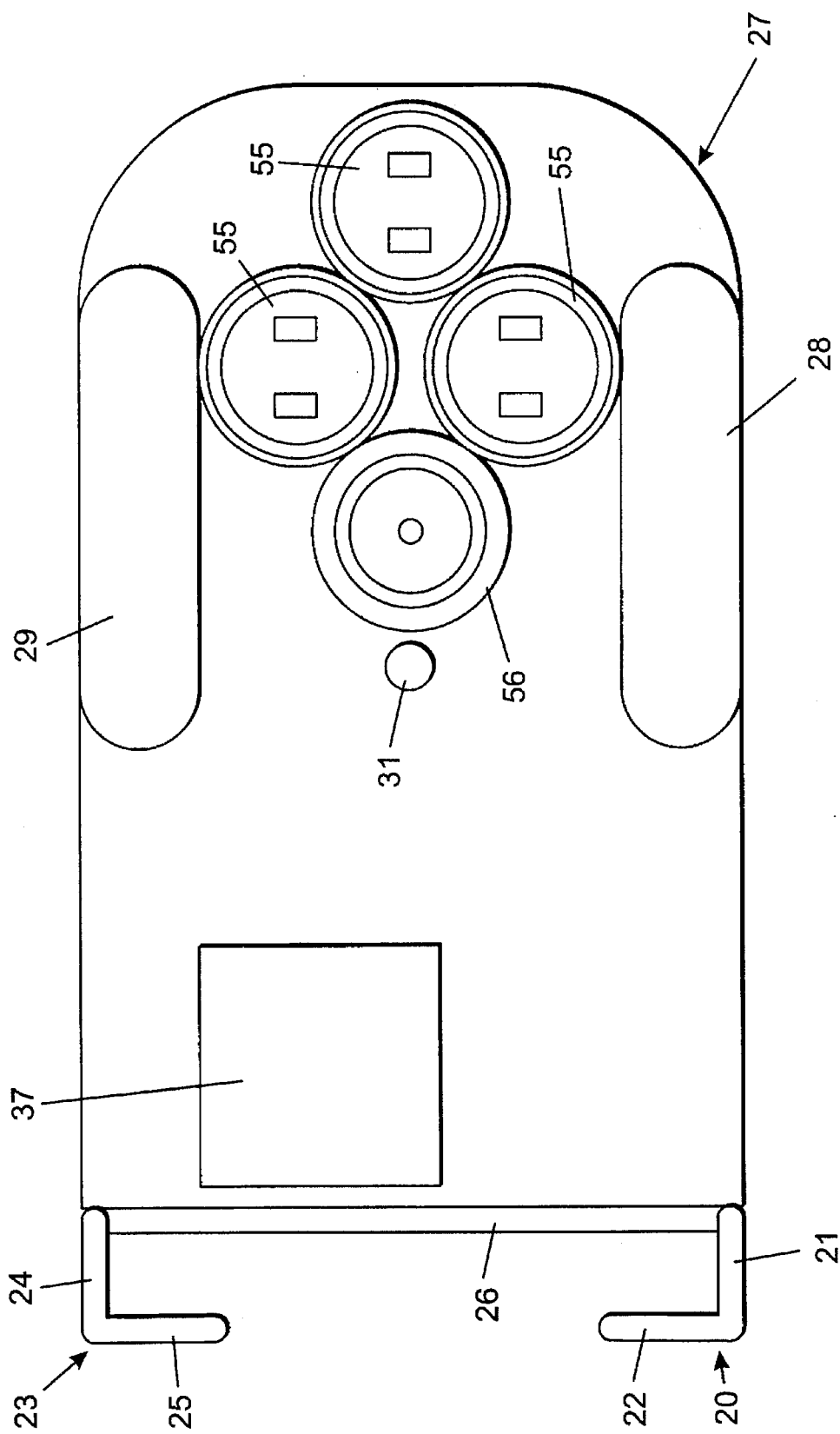
FIG. 19 represents an overhead view of an embodiment of the present invention showing an embodiment of the floor member attached to an embodiment of the frame module, two handle members, three beverage or beverage component tanks, a carbon dioxide tank, an embodiment of a liquid waste holding tank, and an umbrella mounting member.

As seen in FIGS. 12 and 16, the cooler unit may have a number of beverage dispensing valves 35 attached to the front of the cooler unit 32. Although the cooler unit 32 needs to include only one dispensing valve, the cooler unit 32 may include as many dispensing valves as is necessary to dispense the number of beverages contained within the beverage or beverage component container(s). Even if the cart is holding only one flavor or type of drink, more than one dispensing valve may also provide the operator of the cart with the ability to fill drink orders more quickly by filling more than one cup at a time.

Any type of dispensing valve may be used with the invention. Each dispenser valve may dispense a different beverage, providing a great flexibility to the present invention. The pre-mix dispensing system of the present invention may offer customers a variety of flavors of freshly made product such as soda, diet, juice, athletic drinks, sparkling water or at least one variety of beer at the point of sale and a more flexible dispensing capacity.

The dispensing valves 35 preferably are connected to connecting tubes (not shown) which are connected to the tubes running through the cold plate. Therefore, in the case of a carbonated beverage, the beverage preferably will be dispensed by releasing $CO_2$ into the "In" valve of a beverage component tank. The flow of $CO_2$ into the tank causes the beverage component to be pushed through the "Out" valve of the tank.

Preferably completely sealed and under pressure, the tanks are part of a closed beverage system where product is drawn through a product valve. Preferably the beverage then travels from the containers, through connecting tubes, to the cold plate, through the tubes of the cold plate, and through additional connecting tubes to the dispensing valve where it is dispensed into a cup. Preferably, the cart is totally self-sufficient, no electric power or water tanks are needed to dispense the beverage. Preferably, in such an embodiment, one $CO_2$ tank and two, three, or four beverage or beverage component tanks are located in the beverage cart. The $CO_2$ may utilized to push the beverage through the containers, lines, cold plate and dispensing valves at a pressure of approximately forty pounds per square inch. Although, higher and lower delivery pressures are possible.

As a way of catching any beverage which leaks or drips from the dispensing valves, the present invention may include a drip tray 36, various embodiments of which are shown in FIGS. 1, 3, 4, 13–18, 21, 23, and 22–24. The drip tray 36 preferably is located directly under the dispensing valves and may be made of any suitable material, such as metal or plastic. The drip tray 36 may also collect water produced by the melting of the ice within the cooler unit 32 and condensation forming on the surface of the cooler unit. An embodiment of the invention for dispensing heated beverages or other liquids embodiment also include a drip tray to catch any liquid leaking or dripping from a container or dispensing valve, for instance.

As a sanitary and environmental feature, the beverage push cart may include a waste water tank 37 that preferably sits inside the cart, supported by the floor member, underneath the drip tray, as shown in FIGS. 13–17 and 19. The drip tray 36 may drain into the waste water tank 37. The waste water tank 37 may also perform some of the same functions as the drip tray 36 such as collecting water produced by the melting of the ice within the cooler unit 32 and condensation forming on the surface of the cooler unit in embodiments including a cooler unit. The waste water tank 37 may be made of plastic, metal, or any other suitable material.

So as facilitate the conducting of business from the cart, the cart may include a cash box 43, shown in FIGS. 1, 3, 13–18, and 23. The cash box 43 may be conveniently built into cart. In the embodiment shown in FIGS. 1, 3, 13–18, and 23, the cash box 43 may be mounted under the drip tray 36 and the cooler unit 32. Preferably, the cash box 43 is mounted so that it is easily accessible by the operator.

The cash box 43 may be a spring loaded cash box. The built-in cash box 43 offers the seller a convenient change making device that places the money inside the cart under the drip tray. The cash box 43 may have a removable money tray (not shown) which makes it easier for inventory control and accounting purposes. The cash box 43 eliminates the need for flimsy apron holders that could cause money to spill and could be easily accessible to theft. The cash box 43 may include a locking and securing assembly (not shown) to be used when the cart is unattended and not in use.

The cart may also include a lid member 38, various embodiments of which are shown in FIGS. 1–4, 13–16, 18, 21, 23, and 24. The lid member 38 preferably is mounted above the beverage and/or beverage component containers. The edge 39 of the lid member 38 preferably is substantially the same shape as the edge of the floor member 27, however, the floor member and/or the lid member 38 may have a different shape.

Figure 4:
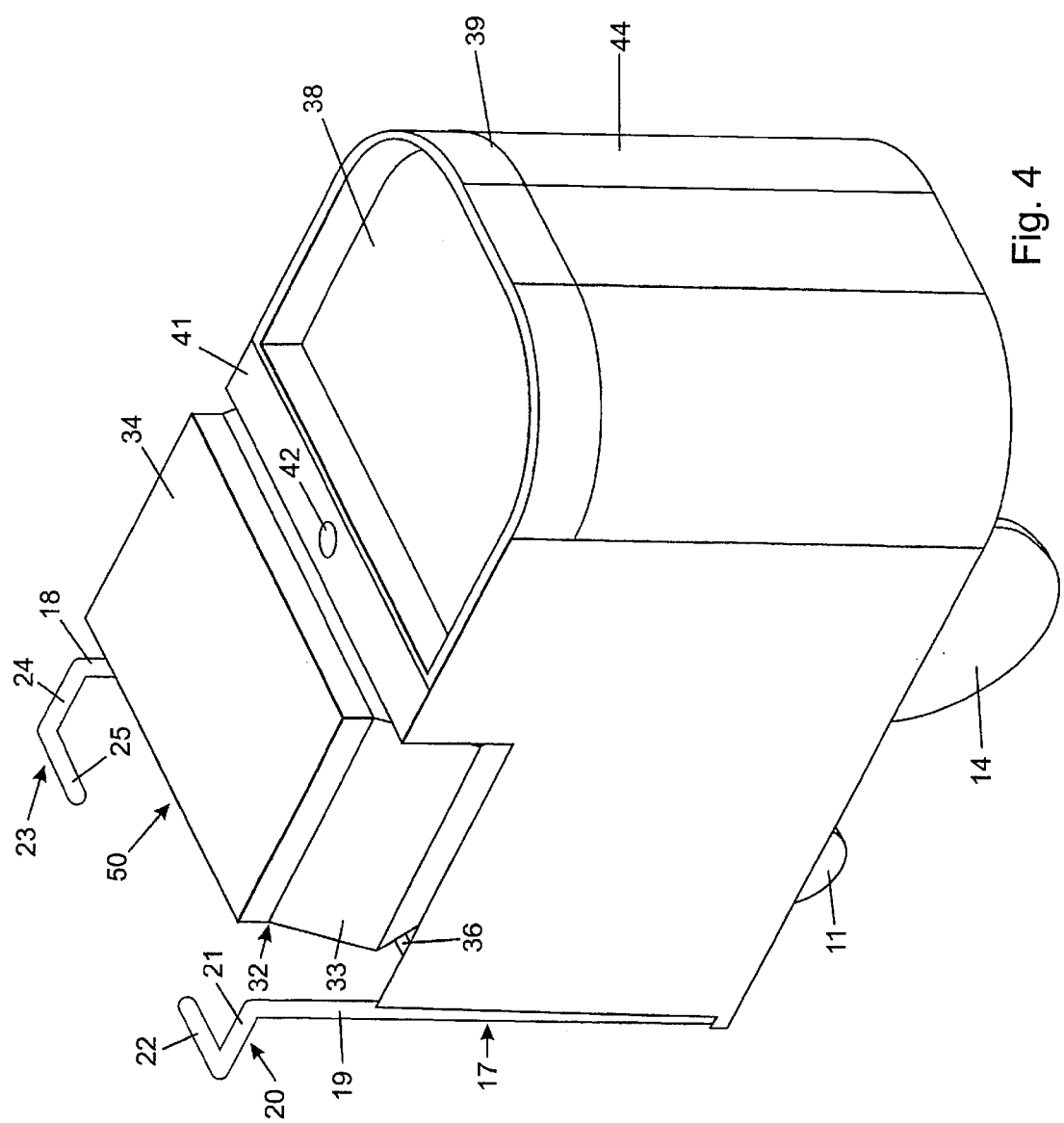
FIG. 4 represents a right front perspective view of the embodiment shown in FIG. 3.

In some embodiments, such as the embodiments shown in FIGS. 3 and 4, the lid member may include a center depression. The depression may cover substantially the entire area of the cart lid member 38, as in the embodiment shown in FIGS. 3 and 4, or some small portion. In the embodiment shown in FIGS. 3 and 4, the depression is bounded by the edge of the lid member 38. Such a depression may provide additional space to store food items customer purchases while the customer searches for money. The high sides of the depression may help to prevent items placed on top of the cart lid member 38 from falling off of the cart.

The lid member 38 may include a cup retaining assembly. The cup receiving assembly may include at least one cup receiving member 40 formed on its upper surface. The cup receiving member 40 may allow drink cups to be temporarily stored while a customer searches for money to pay for an order or while a large order is being filled. The lid member may also serve as an area to display snack items or souvenirs. This storage capacity eliminates the need for two individuals with separate carts and combines beverages and snacks for "one stop" shopping.

In an alternative embodiment, the cup retaining assembly may also or instead comprise one or more cup holders 46. The cup holder(s) 46 may be located in the front of the cart, as shown in FIG. 3, or at other locations, such as where the temporary cup holders 40 are located. Cup holders 46 are not temporary, for storing cups full of beverage as described above, but rather are for longer term storage of empty cups. The cup holders may be located in an end member 45. Placing the cup holders in this location makes the empty cups easily accessible to the operator so as to reduce the amount of time necessary to fill drink orders.

The cup holders may be spring loaded cup holders which have a plate or other element which pushes against the cups to ensure that the cups will continue to be fed out of the cup holders. In such a cup holder, a spring may be located on the side of the spring loaded element opposite the cups.

Preferably, the cup holders 46 have an opening into which the cups are inserted. Protrusions may extend into the opening in which the cups are inserted far enough to retain the cups in the holder but not far enough to prevent the cups from being removed from the cup holder. As each cup is removed, the spring loaded element pushes the next cup out of the cup holder.

Such cup holders may also be located on the lid member as shown in FIG. 2 in the location described above for the temporary cup holders. The cart may also include both the temporary cup holders on the top of the lid member and the spring loaded cup holders in the rear of the cart, just under the cooling and dispensing module.

As seen in FIGS. 1–4, 13–16, 21, 23, and 24, the cart may also include an upper cross member 41. The upper cross member 41 may include umbrella pole receiving and supporting passage 42. The umbrella pole receiving and supporting passage 42 forms a further element of the umbrella mounting assembly. In an embodiment of the present invention which includes an umbrella (not shown), the umbrella pole would be inserted into the passage 42 and advanced through the umbrella pole receiving passage 31 in the floor member until it comes to rest in the umbrella pole receiving member 9 of the frame module shown in FIG. 5. Both the upper cross member and the lid member may be supported by a side member 44 as described in detail below.

An umbrella on the beverage cart may provide coverage from the elements and shade for the operator as well as the ice chest and beverage product(s). An umbrella is also an ideal space for advertising because the top of an umbrella can be seen from a distance and through crowded areas. As noted above, an umbrella may be mounted in an umbrella pole receiving member which may be connected to the frame module of the cart by a 1½" in diameter base.

As shown in FIGS. 1–4, 20, 23, and 24, the cart may include a side member which may surround the cart. The side member 44 may be attached to or rest on the perimeter frame module. As shown in FIGS. 1–4, the lid member 38 and the lid cross supporting member 41 may be supported by the side member 44.

The surface of the side member 44 may provide a location for advertising. The side member 44 may include a space to slide in or an area to snap on promotional graphics to advertise a particular beverage that is being sold or promoted. The graphics could also advertise a sponsor of an event or a sports team, for example. In a typical embodiment, the two sides and front of the beverage cart offer approximately a combined twenty-four square feet of marquee adverting space. Graphics and product promotion are an added feature to sell or promote the beverage product.

Preferably, the side member 44 may be formed using rotational molding of lightweight, polyethylene plastic. The distinct advantages of rotational molding over blow molding and thermoforming are relatively uniform wall thickness with thicker plastic in the corners, the uncompromising strength from stress free and corrosion free durable polyethylene, the ability to produce an "all in one" piece, the drop in manufacturing or unit price costs when increasing production, and the ease with which the surface finish and color can be tailored to suit this cart's look.

The use of rotational molding has several distinct advantages over carts made of metal. Besides being easily maneuvered, this lightweight plastic causes less strain and stress on the operator. This strong "all in one" piece requires less maintenance, less chances of breakage and loose parts, more durability and can be easily cleaned. Additionally, carts built of metal must be pieced together each time no matter how many are produced. With rotational plastic, there are lower manufacturing costs because the "all in one" feature causes the price per unit to decrease tremendously with the increase of production.

The cart may also include an end member 45. The end member 45 may include one or more pieces which preferably are attached near the first end of the cart and include openings providing access to the cash box and the waste water tank located within the cart. All four wheels may be at least partially hidden inside the cart structure by the side member 44 and the end member 45. A wheel cover made of a plastic material may also cover the wheels.

In the embodiment shown in FIG. 3, the end member comprises a lower end member 52 and an upper end member 53. The lower end member 52 is an articulating member concealing the waste water tank. The lower end member 52 may be attached to the cart with hinges (not shown) and may include a clasp 54 to lock it in place. With such a lower end member, the waste water tank may be easily installed and removed to be emptied. The end member in the embodiment shown in FIG. 3 also includes an upper end member which covers the area surrounding the cash box and the cup holders. The embodiment shown in FIG. 1 shows an alternative embodiment of the end member. The end member may not be included in the cart. However, if it is included, it preferably provides access to the interior of the cart to allow for servicing and cleaning of the cart, among other things.

All four wheels may be enclosed inside the cart structure as a safety feature to avoid interfering with pedestrians, to provide more room around the cart for serving customers and to allow maximum movement by the cart. In addition, the caster wheel(s) may include nylon bearings to enable the cart to move swiftly and easily on grassy or hard packed dirt terrain usually found at flea markets or fairs.

Additional accessories which may be included in the cart are spring loaded cup dispensers and containers which can hold lids 47 and straws 48. These accessories may be mounted anywhere on the cart. For instance, the cup holders may be mounted near the rear of the cart as described above. Straw and lid holders may be mounted near the first end of the cart near the cooler unit, as shown in FIG. 1.

In a typical embodiment of the cart shown in FIGS. 1 and 2, the length 57a of the cart, including the handles, is approximately four feet, six inches. The length 57b of the handles in this embodiment is about five inches, making the length 57c of the cart about four feet, one inch. In this embodiment, the overall height 57d of the cart is approximately three feet, five inches. Of this height 57d, about two feet, six inches is represented by the distance 57e between the top surface of the lid member 38 and the bottom surface of the floor member 27. The height of the cart is extended by a distance 57f of about eight inches, which represents the distance between the bottom surface of the floor member and the ground and which is slightly less than the radius of the wheels. The height is further extended by a distance 57g of about three inches which is approximately equal to the distance that the cooling and dispensing unit extends above the upper surface of the lid member. In this embodiment, the tubing used to form the handles is about one inch thick.

Further, in a typical embodiment, as shown in FIG. 20, the width 57h of the cart is about two feet, four inches. Also, the diameter 57i of the main supporting wheel members is about one foot, four inches, and the diameter 57j of the caster wheels is about eight inches. Preferably, the caster wheels in this embodiment are positioned such that the center of the wheels is a distance 57k from the outer surface of the side member of about four inches. Further in this embodiment, the edge of the cross member 8 is positioned a distance 57l about two feet, one-half inch away from the inner surface of the side member.

Figure 22:
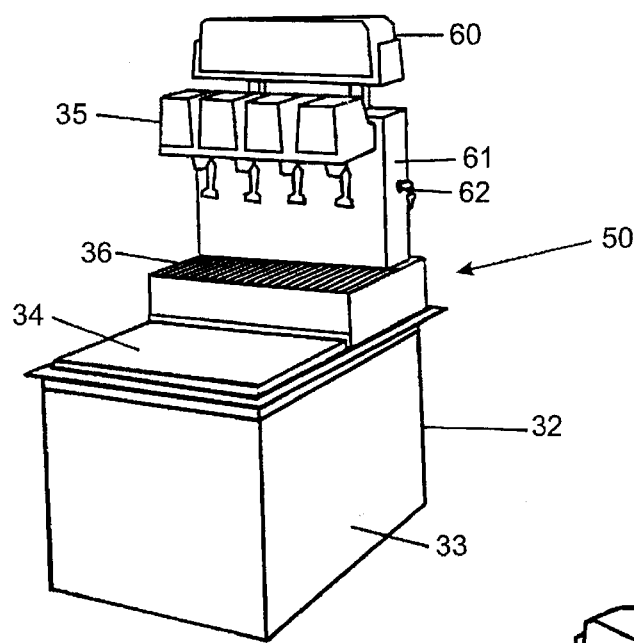
FIG. 22 represents a right rear perspective view of an alternative embodiment of the cooling and dispensing module made from stainless steel.
Figure 23:
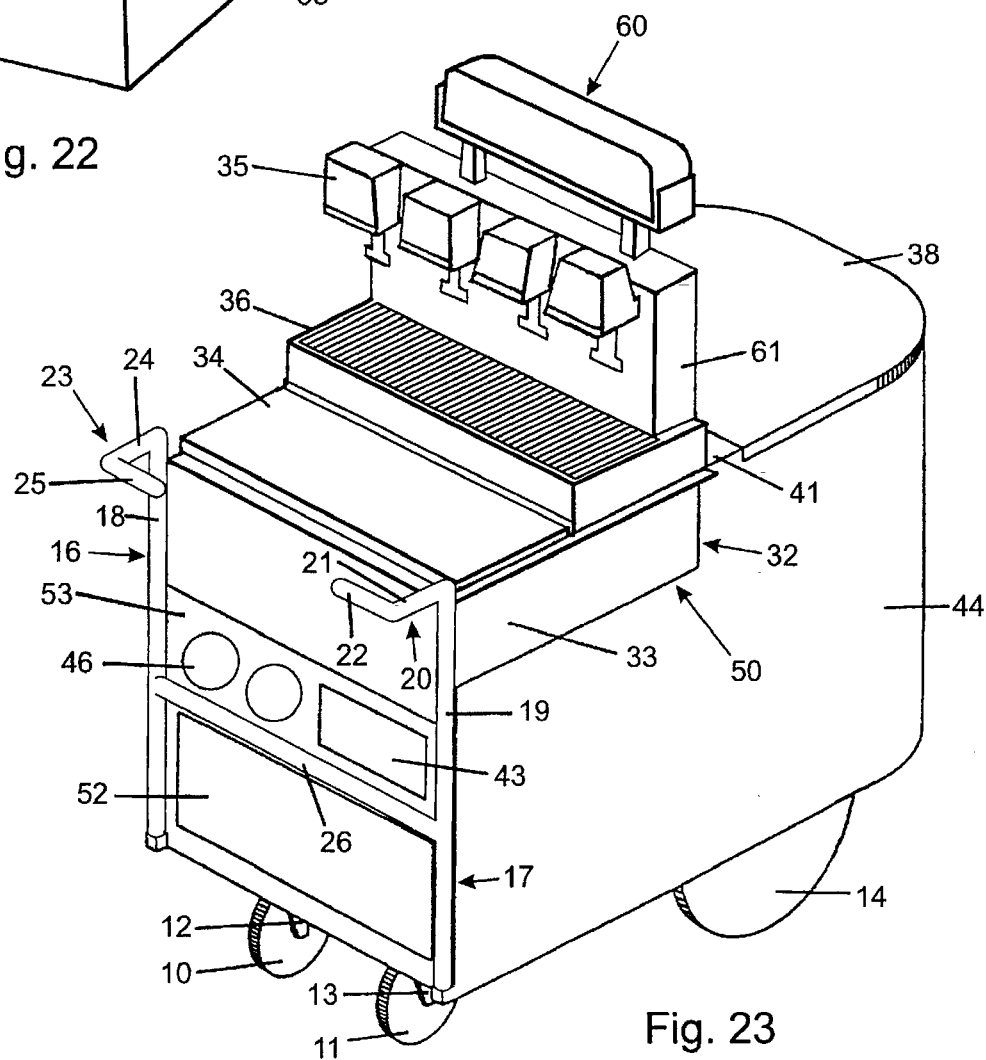
FIG. 23 represents a right rear perspective view of an additional embodiment of the present invention including an embodiment of a stainless steel cooling and dispensing module mounted on the cart.

In an alternative embodiment of the cart, shown in FIG. 23, the components of the cart, including the side member 44, the end member 45, and the beverage dispensing apparatus, including the dispensing valves, may be made of stainless steel. Alternatively, only the cooling and dispensing module may be replaced by the unit shown in FIG. 22, as shown in FIG. 23. A stainless steel cart imparts a more modern and upscale appearance to the cart, which may be necessary in certain locations, such as a theater, where the cart is used.

In the alternative embodiment shown in FIG. 23, the cooler unit and the cold plate, may be located within the embodiment of the cooling and dispensing module shown in FIG. 22. As seen in FIGS. 22 and 23, the beverage dispensing valves 35 may be located on an elevated column 61 extending from the top of the cooling and dispensing module 50. The column 61 may also be made of stainless steel. The column may be topped by an assembly 60 providing space for advertising. If the cooling and dispensing module is replaced with the cooling and dispensing module shown in FIG. 23, the cooling and dispensing module may be supported by tubing extending up through the frame near the first or rear end of the cart. The alternative embodiment of the cooling and dispensing module shown in FIGS. 22 and 23 may also be supported by the supporting surfaces 49 and 51 shown in FIG. 1. The column 60 may include a lock 62 which can secure the dispenser if the operator must leave the cart unattended.

Figure 24:
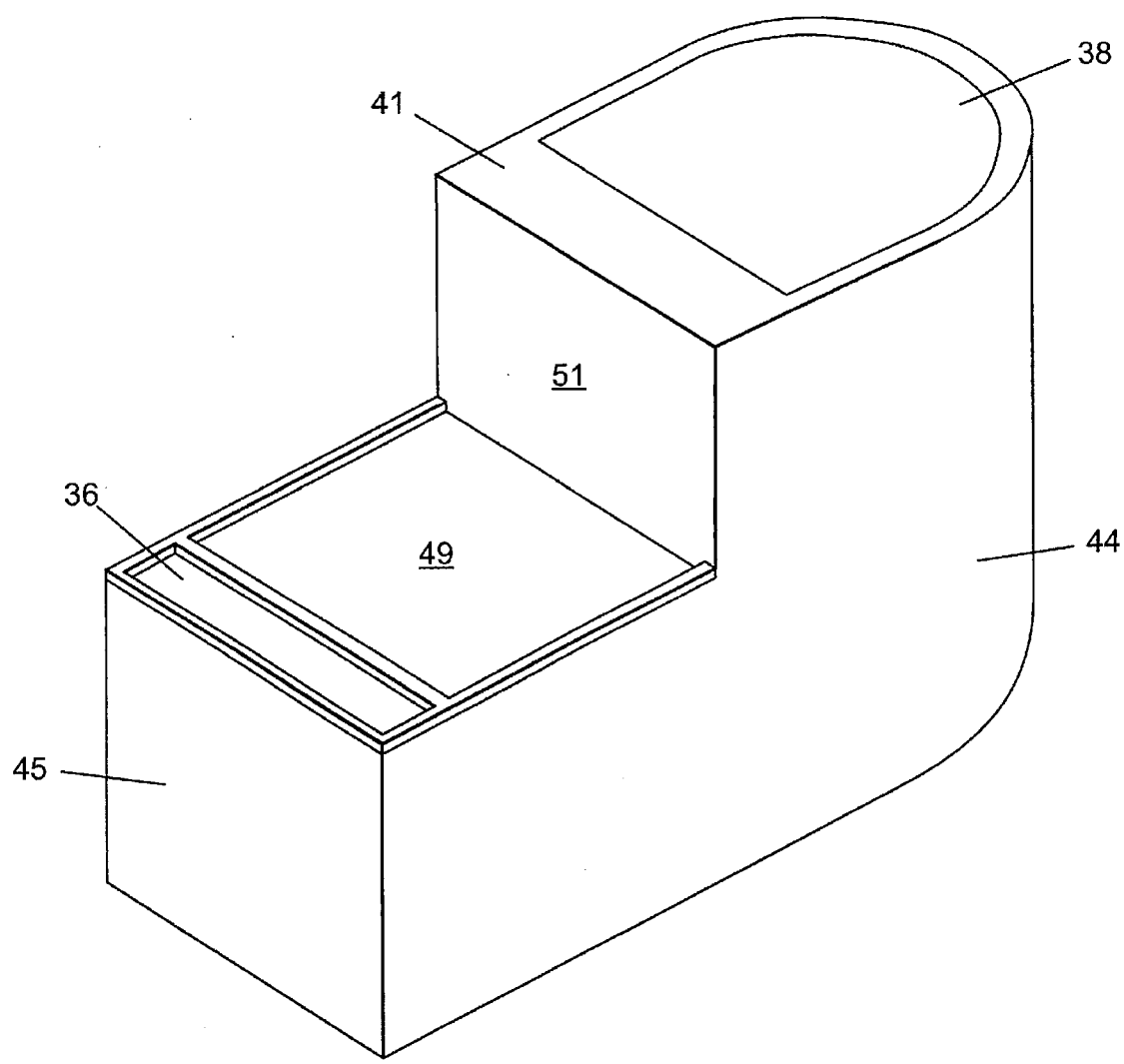
FIG. 24 represents a right rear perspective view of a further alternative embodiment of the present invention especially for use where narrow passages must be traversed.
Figure 25:
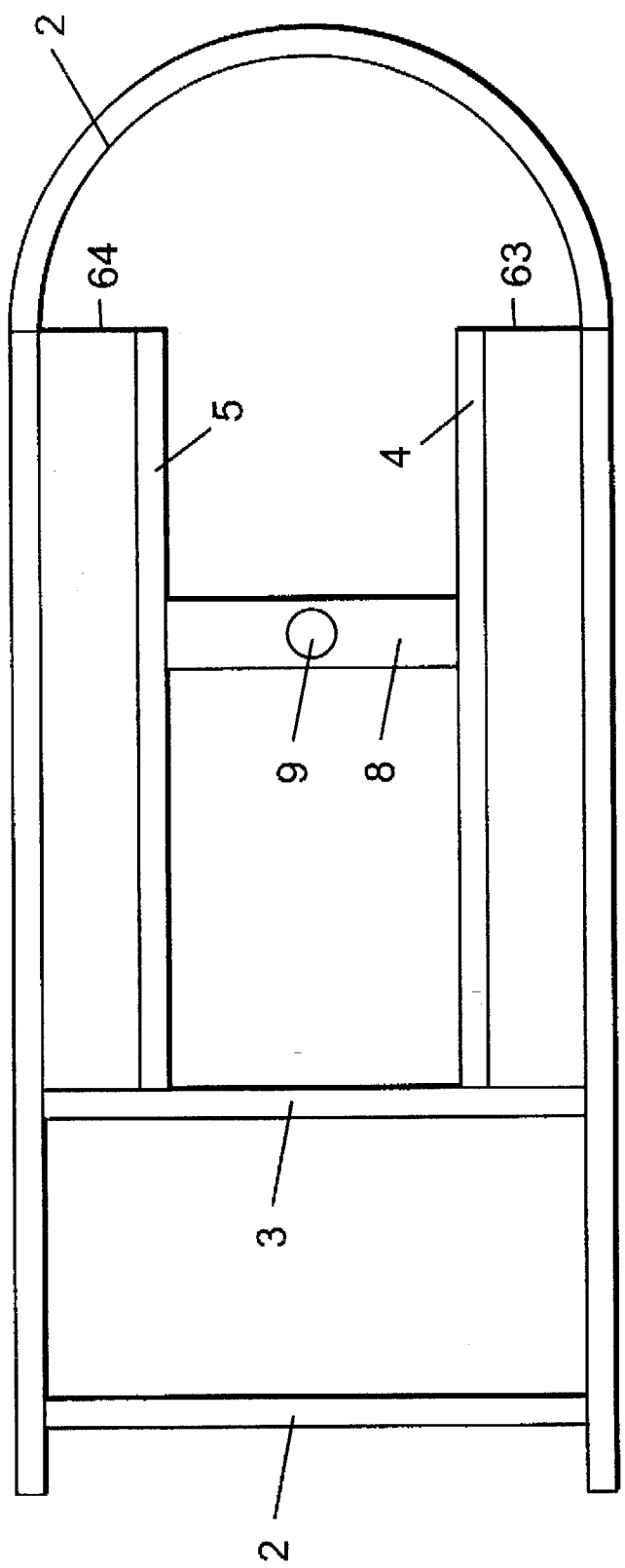
FIG. 25 represents a top view of an embodiment of a frame module for use with an embodiment of the invention similar the embodiment shown in FIG. 24.

A narrower mobile refreshment cart that will transport, store, and dispense chilled beverages is shown in FIGS. 24–28. The narrower embodiment is designed to maneuver through tight and crowded areas, and provides even easier serving mobility. The frame module of the narrower embodiment of the refreshment cart is similar the frame module described above. However, in the narrower embodiment, the cart is narrower and may be slightly longer. One embodiment of the frame module of the narrower cart is shown in FIG. 25.

The right and left main supporting wheel members 14 and 15 may be similar to those described above and may also be supported by similar main supporting wheel mounting assembly. The mounting members 4 and 5 may by attached to the frame member 2 by connecting members 63 and 64, respectively, rather than directly to the frame member 2. The cart may also include at least one caster wheel which may also be mounted on the frame module with caster wheel mounting assembly or on the frame module in a manner similar to that described above in detail for the comparatively wider cart. The handle members may also be similar to those described above. Further, if the cart includes an umbrella, the frame module may include an umbrella mounting assembly similar to the one described above.

The floor member of the narrower embodiments of the cart may be similar to the floor member described above but with a few differences. For instance, the narrower embodiment can not accommodate as many beverage, beverage component, or carbon dioxide tanks. Accordingly, the floor member of the embodiment shown in FIG. 26 and 28 includes three beverage, beverage component, or carbon dioxide container receiving depressions.

Among the other components, the floor member may also include are an umbrella pole receiving member 31 as described above in relation to the floor member for the relatively wider cart. Similarly, the floor member 27 may include main supporting wheel housing members as shown in FIG. 25. The floor member 27 may also include a raised area 54 where the waste water tank may be located. The raised area may help to position the waste water tank and/or other components, such as the side member 44 and the end member 45, on the floor member. The narrower embodiments of the cart may include a drip tray 36 and a cash box 43 as described above. The floor member 27 may also include an additional support 66 to support the cups in a cup holder in the end member of the cart and/or the cup holder itself.

Figure 27:
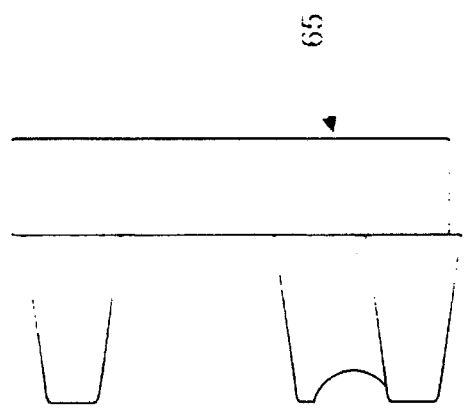
FIG. 27 represents a cross section of an embodiment of a cup dispenser for use with an embodiment of the invention particularly with an embodiment shown in FIGS. 24–26.
Figure 26:
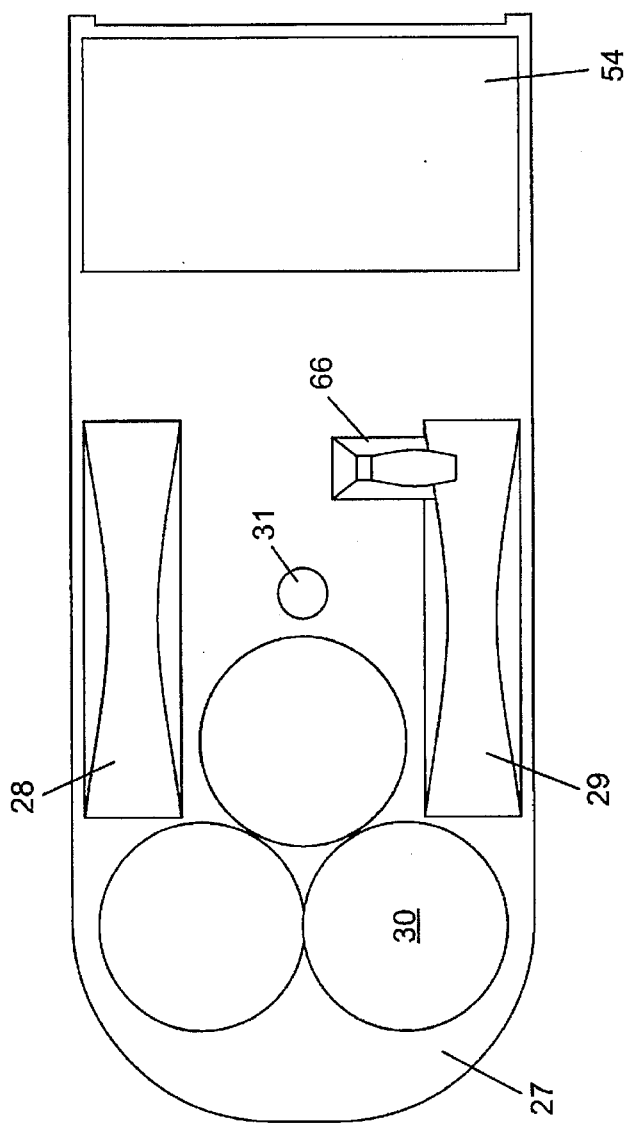
FIG. 26 represents a top view of the floor member of the embodiment shown in FIGS. 24 and 25 including two beverage, beverage component, or carbon dioxide tank retaining members and an umbrella retaining member.
Figure 28:
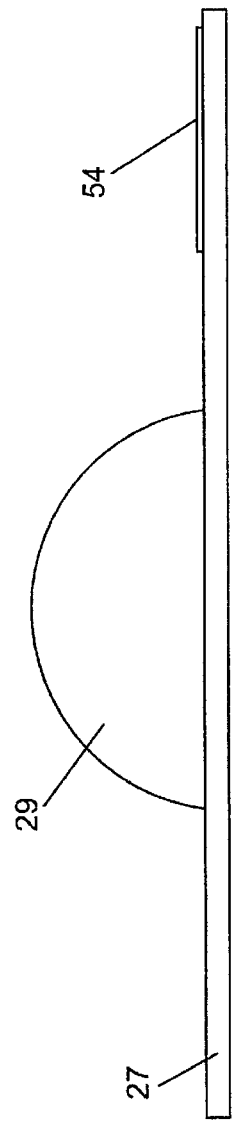
FIG. 28 represents a side view of an embodiment of the floor member of the embodiment shown in FIGS. 26 showing a main supporting wheel member housing members.

FIG. 27 shows a cup dispenser 65 which may be used with the present invention and particularly with the relatively narrower embodiments. Embodiments of the cart including the cup holder shown in FIG. 27 may include an added tube to support the cup dispenser. The support on the surface of the floor member may also help to support the cups and/or cup holder.

On narrower embodiments of the cart, the rotational molding that makes up the shell of the cart may be similar to wider embodiments and still maintain several distinct advantages over carts made of metal. The plastic shell of the narrower cart remains strong, durable and maintenance free rotational plastic. The major difference between the wider and narrower carts is the narrower cart is narrower and longer. An embodiment of the narrower cart with the side member attached is shown in FIG. 24.

Due to the narrower width of the embodiment shown in FIG. 24, the capacity to store the beverage component containers is limited to only two five gallon premix beverage tanks for dispensing soda or beer and one tank for the $CO_2$ component, unlike the larger capacity of wider cart that holds four five gallon tanks and a $CO_2$ tank. The fewer tanks along with the smaller dimensions of the cart result in the weight of the narrower carts being less than the weight of the wider carts. This reduced weight also helps to enable the user to maneuver through narrower aisle ways and selling areas.

The cooling and dispensing module may be similar on the narrower embodiments, expect that the cooler unit is a smaller unit to appropriately fit the smaller size of the narrower embodiments of the cart. The embodiment of the cooling and dispensing module shown in FIG. 22 may also be adapted for use with narrower embodiments of the cart.

In addition to or instead of chilling and dispensing beverages, the mobile cart of the present invention may also dispense heated beverages, such as coffee and tea, or other heated liquids, such as soup.

Figure 29:
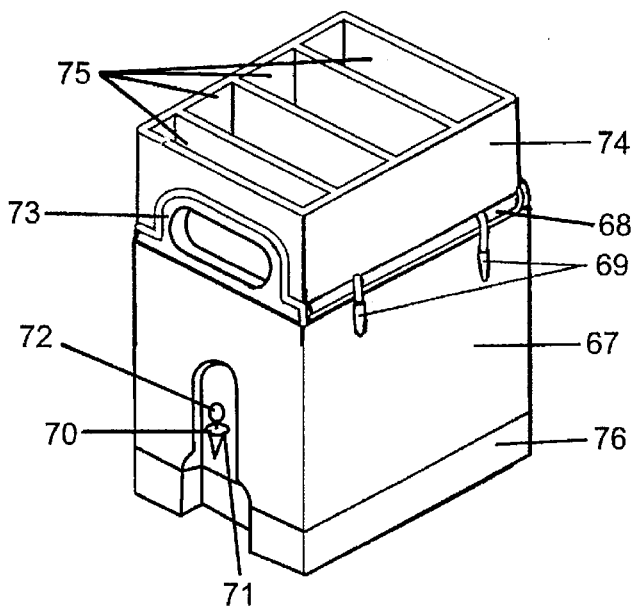
FIG. 29 represents a right rear perspective view of an embodiment of a beverage receiving and dispensing module according to the present invention.

An embodiment of the present invention which dispenses heated beverages preferably is provided with a liquid receiving and dispensing module. One embodiment of a liquid receiving and dispensing module which may be incorporated into a cart according to the present invention is shown in FIG. 29. Any of the embodiments described above, including narrower embodiments, may be adapted to dispense heated beverages or other liquids.

The liquid receiving and dispensing module shown in FIG. 29 includes a liquid receiving container. The liquid receiving container may comprise a vessel 67 including four walls, a bottom, and an open top. The vessel may be made of plastic, metal, or any other suitable material. Preferably, the walls and bottom of the vessel 67 are insulated. The walls and bottom may be insulated between the interior and exterior walls and bottom surfaces with, for example, foam or any other insulating material, or a substantially evacuated space, similar to a vacuum bottle, so as to maintain the material inside the vessel at a desired temperature for an extended time. Since the vessel 67 is insulated, it may be used to maintain and dispense chilled or heated liquids. However, if it is desired to dispense chilled beverages, the above-described embodiments including the chilling and dispensing module may provide better results.

The liquid receiving container shown in FIG. 29 may include a lid 68 to close the open top of the vessel 67. The lid may be made of plastic, metal, or any other suitable material. The lid preferably also is insulated in addition to the walls and bottom of the container. Insulating the lid further helps to ensure that the liquid within the container remains substantially near a desired temperature for an extended time.

A lid used to close the vessel may include at least one protrusion extending downwardly from the bottom surface of the lid to help position the lid in the correct position. The at least one protrusion may also help to maintain the lid on the vessel by snugly fitting within the opening at the top of the vessel 67. Maintaining the lid 68 in position on the vessel 67 still further helps to ensure that the material within the vessel remains at a desired temperature.

The lid 68 of the vessel 67 may be held in place by friction between the edges of the lid and or protrusion. The lid may also be held in place with a variety of securing clamps. The embodiment shown in FIG. 29 includes a plurality of articulating clamps 69, however, any other suitable clamp known to those skilled in the art may be used to clamp the lid in place.

Rather than including a lid, the container may have a top which is joined to the walls as a single unit. The top may have an opening which provides access to the interior of the vessel. The opening may be closed with a screw closure which has threads formed on an exterior surface which engage threads formed on the interior surface of the opening. Such a closure may also be provided on the lid described above. The vessel may also be closed with any other suitable means.

To dispense the liquid within the liquid receiving container, the vessel preferably includes a spigot 70 attached to one of the walls of the vessel. The spigot may be connected to the interior of the vessel by a connecting tube 71. A valve 72 may be actuated to cause the liquid within the vessel to flow through the connecting tube 71 through the spigot 70 and into a container. Any other known valve may also be used to allow the liquid within the vessel 67 to be dispensed.

To facilitate the movement of the liquid receiving container shown in FIG. 29, the vessel 67 may include handles 73 extending upwardly from one or more walls of the vessel.

A container, holder, or receptacle 74 may also be attached to the top of the vessel 67 to receive condiments, eating and/or drinking utensils, souvenirs, or other objects. The container 74 may divided up into a plurality of compartments 75 for segregating the items within the container. The container 74 may fit snugly between the handles 73 and may be held in place by friction between the handles 37 and the sides of the container. The ends of the container 74 adjacent the handles 73 may extend around the handles as shown in FIG. 29 to further ensure that the container remains in place.

The vessel 67 may sit upon a pedestal or riser 76. The pedestal 76 may help to properly position the vessel 67 on the cart and maintain sufficient clearance under the spigot 70 for the cups or other dispensing containers being filled.

Figure 30:
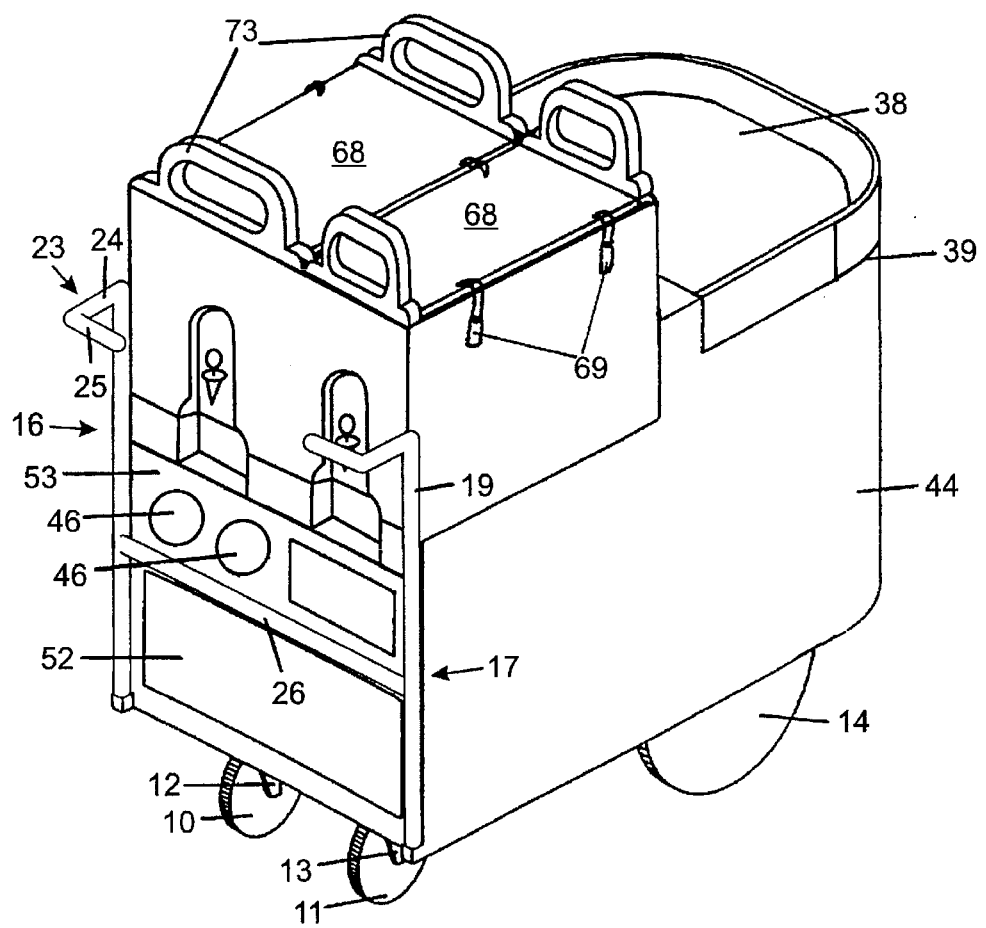
FIG. 30 represents a right rear perspective view of an embodiment of a cart according to the present invention including an embodiment of two beverage receiving and dispensing modules of differing sizes according to the present invention mounted on the cart.

FIG. 30 shows an embodiment of the cart with two liquid containing and dispensing modules according to the embodiment shown in FIG. 29. Depending upon the size of the liquid containing and dispensing modules, the cart may include one, two, three, or any other number of liquid containing and dispensing modules. Therefore, the cart could dispense one or more kinds of caffeinated or decaffeinated tea and/or coffee, soup, or other heated beverage or liquid. The size of the cart, liquid containing and dispensing module(s), and chilling and dispensing unit may be adjusted to allow the cart to accommodate apparatus to dispense both chilled and heated liquids.

Embodiments of the invention for dispensing heated beverages may include all of the components of embodiments dispensing chilled beverages, such as cup holders, a cash tray, a drip tray, and others. Embodiments for dispensing heated beverages may also include the beverage or beverage component retaining assembly to allow the cart to be changed to dispensing heated beverages from dispensing chilled beverages and vice versa. In fact, replacing the chilling and dispensing module with the beverage receiving and dispensing module may be the only difference between embodiments of the cart which dispense heated beverages or other liquids and chilled beverages or other liquids.

The liquid containing and dispensing module provides the mobile refreshment cart with the flexibility to serve hot beverage products or other liquid foods as well as chilled beverages. The chilling and dispensing module may easily be removed and replaced with a liquid containing and dispensing module.

One example of liquid containing and dispensing modules which may be used with the present invention are made by Cambro, including models 1000LCD, 500LCD, 250LCD, 100LCD, 350LCD. The pedestals or risers made by Cambro to work with these containers include models R500LCD and R1000LCD. Examples of containers or holders for condiments, utensils, souvenirs, or other articles include models LCDCH and LCDCH10.

The Cambro containers or other embodiments of the liquid containing and dispensing module and chilling and dispensing module are interchangeable products that can easily be replaced by the other according to the demand for a hot or cold beverage. However, the embodiment of the liquid receiving and dispensing module described above and the Cambro containers these are only examples of liquid containers, pedestals or risers, and condiment holders or containers.

The chilling and dispensing module and liquid receiving and dispensing module create the ability to quickly change from serving, cold to hot beverages or vice versa. For instance, a day long event during cooler months when the morning is brisk may demand a hot beverage such as a cup of hot chocolate and as the day warms, a cold beverage is desired. Another use for this hot/cold liquid versatility is in climates that have cooler mornings and warmer days.

Therefore, in view of the above, the additional hot beverage dispensing application creates a distinct advantage over beverage carts that can only serve a cold beverage.

The design concept of the carts of the present invention is to provide a light weight and truly mobile refreshment dispensing system. Any of the embodiments may dispense chilled and/or heated beverages or other liquids. However, the versatility of both carts offer the user the choice to incorporate a post mix system. Both narrower and wider embodiments have the capacity to adapt to sell post mix soda product by adding a carbonator underneath the cooler unit. All embodiments of the cart preferably can be easily wheeled to a location that has water and electrical sources. The simple connection of water and electric enable the cart to easily dispense post mix beverage product.

The beverage cart of the present invention preferably is totally self-sufficient, requiring no electric power or water tanks to dispense the beverage unlike normally used post-mix systems which rely on concentrate, and electric and water hook-ups to produce a beverage product. Because of the lightweight structure of the cart, it is easily pushed and maneuvered through crowds and congestion in both indoor and outdoor areas. On the other hand, known beverage carts which are called mobile are primarily moved to a stationary selling location and have no true flexibility.

However, embodiments of the beverage cart may be adapted to be connected to an electric source and possibly a source of water. Such a cart could be adapted to dispense post-mix beverages. In other words, the cart could accommodate tanks containing beverage components. Usually, the beverage components are mixed with water, therefore, the cart may require a water source. Also, the electricity could be needed to power a pump to pump the water and beverage components. However, such an embodiment may have limited mobility due to the connections to the water and electricity.

The efficiency and capacity to hold a large quantity of product in this beverage cart increase the opportunity to sell more product in less time than a operator who carries less of the product, where more down time is spent getting refills for the tanks instead of selling. Consequently, when dispensing chilled beverages, this inefficient method of dispensing limits sales and gives the customer a beverage of inconsistent quality and becomes warm very quickly. Accordingly, the cart including four beverage tanks and one $CO_2$ tank may be employed if such problems are anticipated.

The cold plate preferably is kept chilled by the efficient cooling system which means every beverage served is freshly chilled at the proper temperature. Other known cooling systems do not produce the chilling advantage possible with the present invention and, therefore, do not provide an efficient, state of the art cooling system for beverages.

The present invention also provides the capacity to offer one, two, three, four, or more varieties of beer or other beverages at one time. In particular, the ability of the cart to dispense multiple types of beer meets the tremendous demands of the aggressive beer market and today's sophisticated beer tastes. Many beer distributors produce several types of beer for one brand such as regular, dark, light, gold, dry and non-alcoholic. This cart is ideal for brewers who want to sell many different varieties of beer or test market a new brand utilizing this method of consistent quality for dispensing product versus the operator who carries the product and can not adequately chill it.

The flexibility to offer several varieties of non-alcoholic beverages or beer make this cart ideal for the sampling or test market of a product that are now commonly performed, for example, in club stores, supermarkets, and street corners. The new or sampled product will be heated or freshly chilled and ready for immediate consumption. This provides the operator with consistent quality and a true sample of the product at the proper serving temperature.

In this disclosure, there is shown and described only the preferred embodiments of the invention, but, as aforementioned it is to be understood that the invention is capable of use in various other combinations and environments and is capable of changes or modifications within the scope of the inventive concept as expressed herein.

I claim:

1. A mobile cart, comprising:
   a frame module including a plurality of frame members, the frame members including a perimeter frame member having at least one segment, and a caster wheel supporting assembly attached in the vicinity of a first end of said perimeter frame member;

at least one handle member connected in the vicinity of the first end of said perimeter frame member;

right and left main supporting wheels supported by a main supporting wheel mounting assembly, said main supporting wheel mounting assembly including at least one axle member, said at least one axle member being at least partially supported by said perimeter member, said main supporting wheels being located near a second end of said perimeter frame member;

at least one caster wheel supported by said caster wheel supporting assembly, said caster wheel supporting assembly including at least one axle upon which said at least one caster wheel is mounted;

a floor member supported by said frame module, said floor member including a beverage, beverage component, or carbon dioxide container retaining assembly;

a cooling and dispensing module for receiving, chilling and dispensing a beverage, said cooling and dispensing module adapted to be interconnected with a beverage or beverage component container, said cooling and dispensing module including a beverage chilling assembly, and a dispensing unit including at least one dispensing valve for dispensing a beverage under pressure, said beverage chilling assembly including a cold plate for chilling a beverage to be dispensed;

a substantially vertical side module extending at least partially around said perimeter member, said side module including at least one side member; and a lid member at least partially supported by said side member and covering at least said beverage, beverage component, or carbon dioxide container retaining assembly.

2. The mobile cart according to claim 1, further comprising a cooling and dispensing module supporting assembly for supporting the cooling and dispensing module, the cooling and dispensing module supporting assembly being located near the first end of said perimeter frame member.

3. The mobile cart according to claim 1, wherein said side module extends from said perimeter member at least to the level of the base of said cooling and dispensing module in the vicinity the cooling and dispensing module and extending at least to the level of the top of a beverage, beverage component, or carbon dioxide container retained by said beverage, beverage component, or carbon dioxide container retaining assembly in the vicinity of a said beverage, beverage component or carbon dioxide container, said lid member being attached in the vicinity of the top of said side member and extending at least partially over said side member and so as to be supported by said side member and so as to cover an area above said beverage component dispensing containers and said main supporting wheel members.

4. The mobile cart according to claim 3, wherein said side member extends substantially around said cart and is formed as one integrally molded piece.

5. The mobile cart according to claim 1, further comprising a drip tray located at the base of said cooling and dispensing module.

6. The mobile cart according to claim 1, wherein said beverage chilling assembly includes a cold plate.

7. The mobile cart according to claim 1, wherein said beverage or beverage component container retaining assembly includes at least one depression formed in said floor member.

8. The mobile cart according to claim 1, wherein at least one beverage component holding container is retained by said beverage or beverage component container retaining assembly.

9. The mobile cart according to claim 1, further comprising a liquid waste tank supported by said floor member near said first end of said cart.

10. The mobile cart according to claim 1, wherein said frame module further comprises an axle supported by right and left inner main supporting wheel mounting members connected respectively to right and left sides of said perimeter member, a cross bar member connected between a mid-portion of said right side and a mid-portion of said left side of said perimeter member near a mid-portion of said perimeter member, an end cross bar member connecting the ends of said perimeter frame member.

11. The mobile cart according to claim 10, wherein said main supporting wheel members are also supported respectively by said right and left inner main supporting wheel mounting members.

12. The mobile cart according to claim 1, wherein said cart includes upright right and left handle members connected near the first end of said perimeter frame member.

13. The mobile cart according to claim 12, further comprising a door member mounted between said upright handle members.

14. The mobile cart according to claim 1, a cash box supported near the first end of said perimeter frame member.

15. The mobile cart according to claim 1, further comprising two main supporting wheel housing members attached to said floor member.

16. The mobile cart according to claim 1, wherein said cart includes two caster wheels each supported on caster wheel mounting assembly.

17. The mobile cart according to claim 1, wherein said cart includes an umbrella mounting assembly.

18. The mobile cart according to claim 17, further comprising a cross bar member connected between a mid-portion of a right side of said perimeter member and a mid-portion of a left side of said perimeter member, and further comprising an upper cross member extending between a mid-portion of a right said of said side module and a mid-portion of a left side of said side module, wherein said umbrella mounting assembly includes an umbrella pole receiving member attached to said cross bar member and two umbrella pole receiving passages included in said floor member and said upper cross member.

19. The mobile cart according to claim 1, wherein said lid includes at least one cup holder formed in said lid member, said cup holder including a depression formed in the surface of said lid member.

20. The mobile cart according to claim 1, wherein a horizontal cross member is attached between said handle members in a middle portion of said handles, and said handle members each include a horizontal portion mounted near the top of said upright handle members, said horizontal portions providing a surface for applying a force to move said cart.

21. The mobile cart according to claim 1, wherein said floor member includes four beverage or beverage component container receiving members, four beverage component containers being mounted in said receiving members.

22. A mobile cart, comprising:

a frame module including a plurality of frame members, the frame members including a perimeter frame member having at least one segment, and a caster wheel supporting assembly attached in the vicinity of a first end of said perimeter frame member;

at least one handle member connected in the vicinity of the first end of said perimeter frame member;

right and left main supporting wheels supported by a main supporting wheel mounting assembly, said main supporting wheel mounting assembly including right and left main supporting wheel axle members for supporting said right and left main supporting wheel members respectively, said right and left main supporting wheel axle members each supported by said perimeter frame member and an L-shaped axle supporting member attached to the perimeter member near an apex of said perimeter member and on a right side and a left side of said perimeter member, respectively;

at least one caster wheel supported by said caster wheel supporting assembly, said caster wheel supporting assembly including at least one axle upon which said at least one caster wheel is mounted;

a floor member supported by said frame module, said floor member including a beverage, beverage component, or carbon dioxide container retaining assembly;

a cooling and dispensing module, said cooling and dispensing module including a beverage chilling assembly, and a dispensing unit including at least one dispensing valve; and a substantially vertical side module extending at least partially around said perimeter member, said side module including at least one side member.

* * * * *